US012543770B2

(12) United States Patent
McNeff et al.

(10) Patent No.: US 12,543,770 B2
(45) Date of Patent: Feb. 10, 2026

(54) MOISTURE ADDITION SYSTEMS FOR FEED MATERIALS AND RELATED METHODS

(71) Applicant: SarTec Corporation, Anoka, MN (US)

(72) Inventors: Clayton V. McNeff, Andover, MN (US); Larry C. McNeff, Anoka, MN (US); Peter G. Greuel, Anoka, MN (US)

(73) Assignee: SarTec Corporation, Anoka, MN (US)

( * ) Notice: Subject to any disclaimer, the term of this patent is extended or adjusted under 35 U.S.C. 154(b) by 708 days.

(21) Appl. No.: 16/268,045

(22) Filed: Feb. 5, 2019

(65) Prior Publication Data

US 2019/0239552 A1    Aug. 8, 2019

Related U.S. Application Data

(60) Provisional application No. 62/777,999, filed on Dec. 11, 2018, provisional application No. 62/626,300, filed on Feb. 5, 2018.

(51) Int. Cl.
| | |
|---|---|
| *A23N 17/00* | (2006.01) |
| *A23K 10/30* | (2016.01) |
| *A23K 10/38* | (2016.01) |
| *A23K 20/147* | (2016.01) |
| *A23K 20/158* | (2016.01) |
| *A23K 20/163* | (2016.01) |
| *A23K 20/174* | (2016.01) |

(52) U.S. Cl.
CPC ............ *A23N 17/008* (2013.01); *A23K 10/30* (2016.05); *A23K 10/38* (2016.05); *A23K 20/147* (2016.05); *A23K 20/158* (2016.05); *A23K 20/163* (2016.05); *A23K 20/174* (2016.05); *A23N 17/007* (2013.01)

(58) Field of Classification Search
CPC .... A23N 17/00; A23N 17/007; A23N 17/008; A23K 10/38; A23K 20/147; A23K 20/163; A23K 20/158; A23K 20/174; A23K 10/30
USPC ........................................................ 426/231
See application file for complete search history.

(56) References Cited

U.S. PATENT DOCUMENTS

| | | | | |
|---|---|---|---|---|
| 3,667,734 A * | 6/1972 | Skromme et al. | .... | B01F 33/502 366/312 |
| 3,806,001 A * | 4/1974 | Pratt | .................... | A23N 17/007 222/1 |
| 4,131,845 A * | 12/1978 | Pakulis | .................. | G01N 22/04 324/690 |
| 4,733,971 A * | 3/1988 | Pratt | .................... | B01F 35/7544 366/292 |
| 5,709,894 A * | 1/1998 | Julien | .................... | A23K 50/10 426/54 |
| 5,794,423 A * | 8/1998 | McLeod | ................. | A01D 41/02 56/122 |
| 6,440,475 B1 | 8/2002 | Mcneff et al. | | |
| 8,430,006 B2 * | 4/2013 | Stanojevic | ............. | B26D 1/553 83/281 |
| 8,629,681 B1 * | 1/2014 | Trabelsi | ................. | G01N 22/04 324/637 |
| 2007/0292564 A1 * | 12/2007 | Hu | ......................... | A23K 10/37 426/31 |
| 2010/0024807 A1 * | 2/2010 | Burke | .................... | C12M 45/06 127/1 |
| 2024/0041819 A1 | 2/2024 | McNeff et al. | | |

FOREIGN PATENT DOCUMENTS

| | | | | | |
|---|---|---|---|---|---|
| GB | | 2304477 A | * | 3/1997 | ........... B28C 7/0409 |
| WO | WO-9618084 A1 | * | 6/1996 | ............. G01D 3/032 |

OTHER PUBLICATIONS

NPL Katsunuma et al. (in Animal Science Journal 71 (2) : 164-170, 2000) (Year: 2000).*
NPL Moisture content (2013) [Entitled Determining Forage Quality: Understanding Feed Analysis]. (Year: 2013).*
Google search for forage quality provides the NPL moisture content (2013) [See #5 article retrieved on Mar. 30, 2022]. (Year: 2022).*
NPL Waller et al. (in Extension Bulletin E-1654; Sep. 1982) (Year: 1982).*
Google Search Report (retrieved on Aug. 8, 2024) (Year: 2024).*
Google Search (Retrieved on Aug. 8, 2024). (Year: 2024).*
Google Search—Microwave sensor for moisture content in food (Retrieved on Aug. 9, 2024). (Year: 2024).*
Buescher, W. et al., "NIRS Sensor Controlled Total-Mixed-Ration for Nutrient Optimized Feeding of Dairy Cattle," Institute of Agriculture Engineering, Livestock Technology, University of Bonn, Germany 2014 (8 pages).
"Hydro-Probe," Hydronix Digital Microwave Moisture Sensor for Bins, Silos and Conveyors Brochure downloaded from www.hydronix.com at least as early as Dec. 8, 2017 (4 pages).

(Continued)

*Primary Examiner* — Erik Kashnikow
*Assistant Examiner* — Bhaskar Mukhopadhyay
(74) *Attorney, Agent, or Firm* — Pauly, De Vries Smith & Deffner LLC

(57) ABSTRACT

Embodiments include moisture addition systems and methods. In an embodiment, a system includes a vessel defining an interior volume, a fluid supply system to add fluid into the vessel, a first moisture sensor, and a control module. The first moisture sensor is configured to measure the moisture content of a material within the vessel, such as a total mixed ration (TMR). The first moisture sensor can include a microwave moisture sensor. The control module is configured to control the fluid supply system. The control module controls the amount and rate at which fluid is added to the vessel. The control module is configured to receive a signal regarding the moisture content within the vessel from the first moisture sensor. The amount or rate at which fluid is added can be varied based on the moisture content within the vessel. Other embodiments are also included herein.

19 Claims, 14 Drawing Sheets

(56) References Cited

OTHER PUBLICATIONS

"Measuring Moisture and Brix," Hydronix Digital Moisture Measurement Sensors for Bulk Solids and Liquids Brochure downloaded from www.hydronix.com at least as early as Dec. 8, 2017 (4 pages).

* cited by examiner

MOISTURE ADDITION SYSTEMS FOR FEED MATERIALS AND RELATED METHODS

This application claims the benefit of U.S. Provisional Application No. 62/626,300, filed Feb. 5, 2018, and U.S. Provisional Application No. 62/777,999, filed Dec. 11, 2018, the contents of which are herein incorporated by reference in their entireties.

FIELD OF THE TECHNOLOGY

The present application relates to moisture addition systems and methods. More specifically, the present application relates to moisture addition systems incorporating at least one microwave moisture sensor and related method.

BACKGROUND

Grain is typically stored in a relatively low-moisture state since, all things being equal, grain deteriorates faster as temperature and moisture content increase. By way of example, corn and sorghum is commonly stored at a moisture content of around 14%. Soybeans, wheat, oats and barley are common stored at a moisture content of around 13%. Rice and sunflowers are stored at even lower moisture contents.

However, in preparation for use, the moisture content must typically be increased. Therefore, moisture addition in an important aspect in many grain and feed material processing applications. As a specific example, moisture addition is an important aspect in milling operations and other uses of grain such as preparing it for use as feed.

SUMMARY

Embodiments disclosed herein include moisture addition systems and methods. In a first aspect, a moisture addition system, is included having a vessel defining an interior volume. A fluid supply system is included and can be configured to add fluid into the interior volume of the vessel. A first moisture sensor can be included and can be configured to measure the moisture content of a material within the vessel, the first moisture sensor comprises a microwave moisture sensor. A control module can be included and can be configured to control the fluid supply system, wherein the control module controls the amount and rate at which fluid is added to the vessel. The control module can be configured to receive a signal regarding the moisture content within the vessel from the first moisture sensor. The amount or rate at which fluid is added can be varied based on the moisture content within the vessel.

In a second aspect, in addition to one or more of the preceding or following aspects, or in the alternative to some aspects, the system can also include a feedstuff material supply system configured to control the rate at which a feedstuff material is added into the vessel, and wherein the control module is configured to control the feedstuff material supply system.

In a third aspect, in addition to one or more of the preceding or following aspects, or in the alternative to some aspects, the fluid supply system can include a fluid control valve configured to control the rate at which fluid is added to the interior volume of the vessel.

In a fourth aspect, in addition to one or more of the preceding or following aspects, or in the alternative to some aspects, the control module can be configured to determine when the moisture content of the interior of the vessel is not within an expected moisture range.

In a fifth aspect, in addition to one or more of the preceding or following aspects, or in the alternative to some aspects, the control module can be configured to enter a warning state when the moisture content of the interior of the vessel is not within the expected moisture range.

In a sixth aspect, in addition to one or more of the preceding or following aspects, or in the alternative to some aspects, a motor vehicle is included, wherein the vessel is mounted on the motor vehicle.

In a seventh aspect, in addition to one or more of the preceding or following aspects, or in the alternative to some aspects, a second moisture sensor can be included and can be configured to measure the moisture content of the feedstuff material prior to entering the vessel.

In an eighth aspect, in addition to one or more of the preceding or following aspects, or in the alternative to some aspects, the second moisture sensor can be a capacitance sensor.

In a ninth aspect, in addition to one or more of the preceding or following aspects, or in the alternative to some aspects, the warning state can be a result of the moisture content in the vessel being greater than the predicted range of moisture content.

In a tenth aspect, in addition to one or more of the preceding or following aspects, or in the alternative to some aspects, in response to the moisture content being greater than the predicted range of moisture content the fluid control valve decreases the rate of fluid being added to the vessel.

In an eleventh aspect, in addition to one or more of the preceding or following aspects, or in the alternative to some aspects, the system can further include a feedstuff material supply system configured to control the rate at which feedstuff material is added into the vessel and the control module is configured to control the feedstuff material supply system. In response to the moisture content being greater than the predicted range of moisture content, the feedstuff material control increases the rate of feedstuff material being added to the vessel.

In a twelfth aspect, in addition to one or more of the preceding or following aspects, or in the alternative to some aspects, the warning state can be a result of the moisture content in the vessel being less than the predicted range of moisture content.

In a thirteenth aspect, in addition to one or more of the preceding or following aspects, or in the alternative to some aspects, in response to the moisture content being less than the predicted range of moisture content the fluid control valve increases the rate of fluid being added to the vessel.

In a fourteenth aspect, in addition to one or more of the preceding or following aspects, or in the alternative to some aspects, a feedstuff material supply system can be configured to control the rate at which feedstuff material is added into the vessel and the control module can be configured to control the feedstuff material supply system. In response to the moisture content being less than the predicted range of moisture content the feedstuff material control decreases the rate of feedstuff material being added to the vessel.

In a fifteenth aspect, in addition to one or more of the preceding or following aspects, or in the alternative to some aspects, a known amount of feedstuff material is added to the interior volume of the vessel.

In a sixteenth aspect, in addition to one or more of the preceding or following aspects, or in the alternative to some aspects, a calculated amount of fluid is added to the interior volume of the vessel.

In a seventeenth aspect, in addition to one or more of the preceding or following aspects, or in the alternative to some aspects, the calculated amount of fluid is determined based on the moisture content of feedstuff material before entering the interior volume, the known amount of feedstuff material being added to the interior volume, and a desired moisture content of the feedstuff material after conditioning.

In an eighteenth aspect, in addition to one or more of the preceding or following aspects, or in the alternative to some aspects, the predicted range of moisture content comprises a high moisture limit and a low moisture limit.

In a nineteenth aspect, in addition to one or more of the preceding or following aspects, or in the alternative to some aspects, a feedstuff material supply system is included and is configured to control the rate at which feedstuff material is added into the vessel, and the control module is configured to control the feedstuff material supply system. The predicted range of moisture content varies as the feedstuff material control or fluid control is changed.

In a twentieth aspect, in addition to one or more of the preceding or following aspects, or in the alternative to some aspects, the control module can be configured to monitor the moisture content in the interior volume while feedstuff material or fluid is being added to the interior volume.

In a twenty-first aspect, in addition to one or more of the preceding or following aspects, or in the alternative to some aspects, the predicted range of moisture content can be recalculated based on the measured moisture content of the material in the vessel while feedstuff material or fluid was being added to the interior volume.

In a twenty-second aspect, in addition to one or more of the preceding or following aspects, or in the alternative to some aspects, a feedstuff material supply system can be configured to control the rate at which feedstuff material is added into the vessel and the control module can be configured to control the feedstuff material supply system. In some cases, the moisture content of feedstuff material prior to entering the interior volume is less than about 16 percent by weight.

In a twenty-third aspect, in addition to one or more of the preceding or following aspects, or in the alternative to some aspects, the system adds enough moisture content to raise the moisture of the feedstuff material to at least 20 percent by weight.

In a twenty-fourth aspect, in addition to one or more of the preceding or following aspects, or in the alternative to some aspects, the fluid comprises water and an additive.

In a twenty-fifth aspect, in addition to one or more of the preceding or following aspects, or in the alternative to some aspects, the fluid comprises at least 0.1% by weight additive.

In a twenty-sixth aspect, in addition to one or more of the preceding or following aspects, or in the alternative to some aspects, the additive includes a saponin containing composition.

In a twenty-seventh aspect, in addition to one or more of the preceding or following aspects, or in the alternative to some aspects, the saponin containing composition includes a *Yucca* extract.

In a twenty-eighth aspect, in addition to one or more of the preceding or following aspects, or in the alternative to some aspects, the feedstuff material includes grain.

In a twenty-ninth aspect, in addition to one or more of the preceding or following aspects, or in the alternative to some aspects, the feedstuff material includes animal feed and/or a total mixed ration.

In a thirtieth aspect, in addition to one or more of the preceding or following aspects, or in the alternative to some aspects, the control module displays an estimated time when the calculated amount of fluid will have been added to the vessel.

In a thirty-first aspect, in addition to one or more of the preceding or following aspects, or in the alternative to some aspects, the control module is configured to adjust the estimated time based on the moisture content of the material in the interior volume being outside of the expected moisture range.

In a thirty-second aspect, a method of conditioning a feedstuff material, is included. The method includes adding fluid to an interior volume of a vessel, wherein a fluid control controls the rate and amount of fluid being added. The methods also includes measuring the moisture content of a material within the interior volume of the vessel with a microwave sensor and adjusting the rate or amount of fluid being added based on the measured moisture content of the material within the interior volume.

In a thirty-third aspect, in addition to one or more of the preceding or following aspects, or in the alternative to some aspects, the material includes a fluid and a feedstuff material.

In a thirty-fourth aspect, in addition to one or more of the preceding or following aspects, or in the alternative to some aspects, the fluid includes water and an additive.

In a thirty-fifth aspect, in addition to one or more of the preceding or following aspects, or in the alternative to some aspects, the method further includes adding a feedstuff material to the interior volume of the vessel, wherein a feedstuff material control controls the rate and amount of feedstuff material being added;

In a thirty-sixth aspect, in addition to one or more of the preceding or following aspects, or in the alternative to some aspects, the method further includes comparing the measured moisture content to a predicted range of moisture content.

In a thirty-seventh aspect, in addition to one or more of the preceding or following aspects, or in the alternative to some aspects, the method further includes entering a warning state if the measured moisture content is outside the predicted range of moisture content.

In a thirty-eighth aspect, in addition to one or more of the preceding or following aspects, or in the alternative to some aspects, the method further includes updating the predicted range of moisture content based on the measured moisture content of the material within the interior volume of the vessel.

In a thirty-ninth aspect, in addition to one or more of the preceding or following aspects, or in the alternative to some aspects, the method further includes measuring the moisture content of the feedstuff material prior to being added to the interior volume of the vessel.

In a fortieth aspect, in addition to one or more of the preceding or following aspects, or in the alternative to some aspects, the moisture content of the feedstuff material prior to being added to the interior volume of the vessel is measured with a capacitance sensor.

In a forty-first aspect, in addition to one or more of the preceding or following aspects, or in the alternative to some aspects, the warning state can be a result of the moisture content in the vessel being greater than the predicted range of moisture content.

In a forty-second aspect, in addition to one or more of the preceding or following aspects, or in the alternative to some aspects, the method further includes decreasing the rate or amount of fluid being added to the interior volume in response to the moisture content being greater than the predicted moisture content.

In a forty-third aspect, in addition to one or more of the preceding or following aspects, or in the alternative to some aspects, the warning state can be a result of the moisture content in the vessel being less than the predicted range of moisture content.

In a forty-fourth aspect, in addition to one or more of the preceding or following aspects, or in the alternative to some aspects, the method further includes increasing the rate or amount of fluid being added to the interior volume in response to the moisture content being less than the predicted range of moisture content.

In a forty-fifth aspect, in addition to one or more of the preceding or following aspects, or in the alternative to some aspects, a known amount of feedstuff material is added to the interior volume of the vessel.

In a forty-sixth aspect, in addition to one or more of the preceding or following aspects, or in the alternative to some aspects, the method further includes calculating an amount of fluid to added to the interior volume based on the known amount of feedstuff material, a moisture content of the feedstuff material prior to entering the interior volume, and a desired moisture content of the feedstuff material after conditioning.

In a forty-seventh aspect, in addition to one or more of the preceding or following aspects, or in the alternative to some aspects, the predicted range of moisture content comprises a high moisture limit and a low moisture limit.

In a forty-eighth aspect, in addition to one or more of the preceding or following aspects, or in the alternative to some aspects, the method further includes updating the predicted range of moisture content as the adding of fluid is changed.

In a forty-ninth aspect, in addition to one or more of the preceding or following aspects, or in the alternative to some aspects, the method further includes updating the predicted range of moisture content based on the measured moisture content of the feedstuff material prior to entering the interior volume.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present application is defined by the appended claims and their legal equivalents.

BRIEF DESCRIPTION OF THE FIGURES

The technology may be more completely understood in connection with the following drawings, in which.

While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION

As described above, the moisture content of grains and other feed materials must typically be increased over the relatively low moisture content of many materials in a storage state. As such, grain conditioning systems and methods have been developed to modify the moisture content of the grain to a desired level. However, many existing grain conditioning systems operate based on inaccurate measurements of the moisture content of the grain or other feed components being conditioned. In particular, some systems measure moisture content extremely inaccurately when there is free moisture present, which is problematic because there is frequently free moisture present after moisture has been added as part of a moisture adjustment process.

In some cases, animals may be feed with a total mixed ration (TMR). A total mixed ration is the result of weighing and blending all feedstuffs into a complete ration which provides adequate nourishment for a given animal and may be their sole source of feed. Control of moisture content of a TMR is extremely important because of its impact on the total energy provided by a given weight of food material. The higher the moisture content of the TMR, the lower the energy per pound. Therefore, inaccuracy in adjusting the moisture content of a TMR leads to accidental under-nourishment or over-nourishment of animals, both of which are extremely bad for health and productivity. Accordingly, there is a need for more accurate and efficient moisture addition systems and methods for feedstuff materials such as grains, other feedstuffs, and total mixed ration compositions.

Embodiments herein can include a microwave sensor disposed within a vessel to monitor the moisture level of the material within the vessel. In various embodiments, feedstuffs and fluid can be added to a vessel and mixed together in order to increase the moisture content of the feedstuffs. In some embodiments, the feedstuffs can be conditioned in a batch type process. In some embodiments, a known quantity of feedstuffs are added to the vessel prior to adding any fluid to the vessel. In other embodiments, the addition of feedstuffs and the addition of fluid can at least partially occur at the same time. The continuous monitoring of the moisture content of the material within the vessel can allow the system to adjust the rates and/or the amounts of feedstuffs and/or fluid being added to the vessel in order to reach a desired moisture content.

Figure 1:
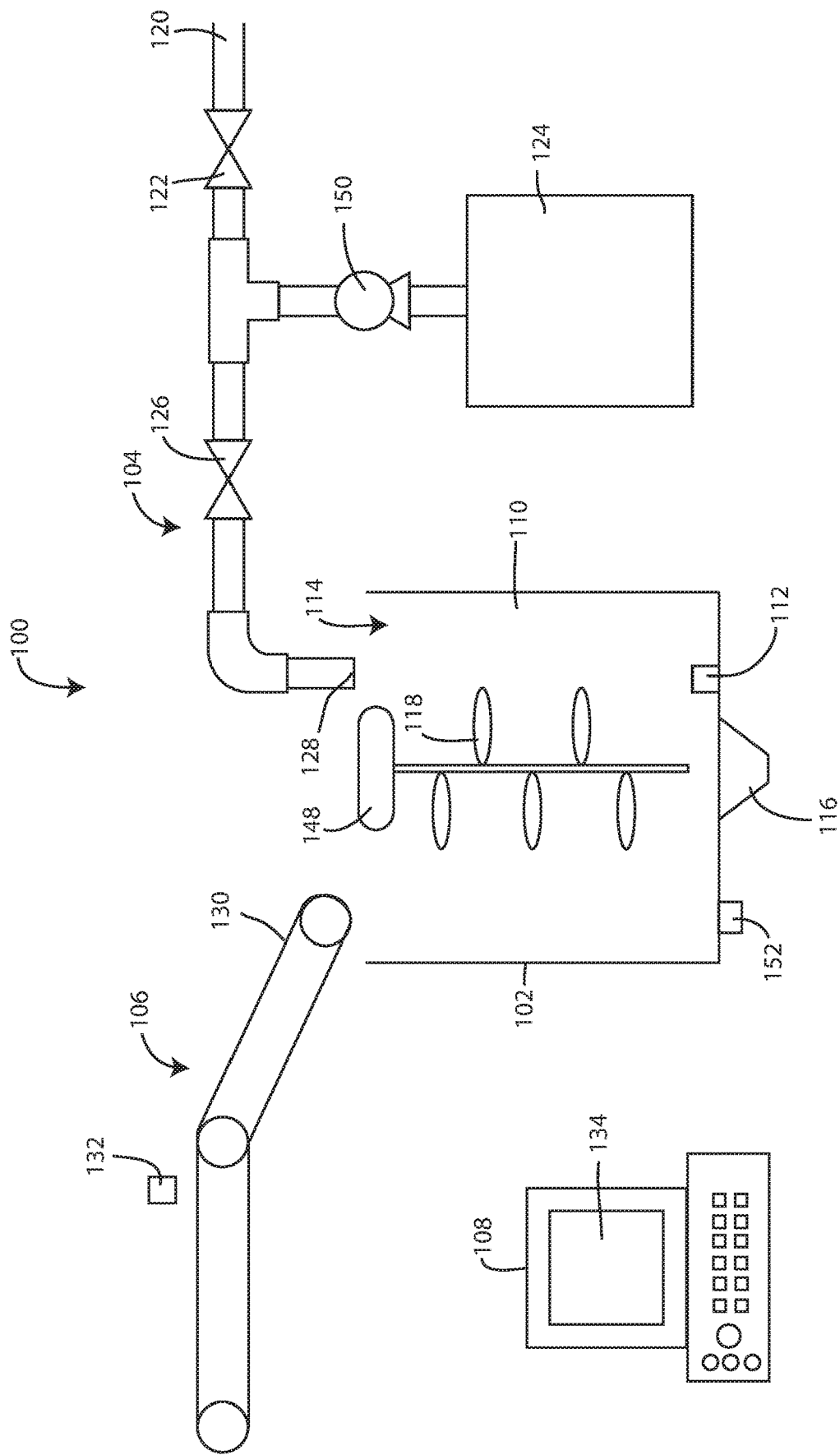
FIG. 1 is a schematic view of a moisture addition system, according to an embodiment.

In reference now to the figures, FIG. 1 shows a schematic view of a moisture addition system 100. In an embodiment, the moisture addition system can include a vessel 102, a fluid supply system 104, a feedstuff supply system 106, and a control module 108.

The vessel 102 can define an interior volume 110. The interior volume 110 can be configured to hold or store the feedstuffs being conditioned. The fluid supply system 104 can be configured to deliver fluid into the interior volume 110, such as to be mixed with the feedstuffs. The feedstuff supply system 106 can be configured to deliver feedstuffs into the interior volume 110, such as to be mixed with the fluid. The control module 108 can be configured to monitor the moisture content of the material within the interior volume 110, as well as to control the addition of feedstuffs and/or fluid into the vessel 102.

Vessel

In some embodiments, various components can be disposed within the interior volume 110 of the vessel 102. In some embodiments, a first moisture sensor 112 can be disposed within the interior volume 110. The first moisture sensor 112 can be configured to measure the moisture content of the material within the vessel 102. The first moisture sensor 112 can measure the moisture content of the material within the vessel while fluid and/or feedstuffs are being added to the interior volume 110.

In various embodiments, the first moisture sensor 112 can include a microwave moisture sensor. By way of example, a material to be measured can be passed across the microwave moisture sensor which radiates an extremely low powered electromagnetic field. Due to the dipolar effect of a water molecule, the resonant frequency of a microwave resonator changes with variations in moisture content. It is these variations that are detected by the sensor electronics. They are then measured in terms of 'unscaled units' which are scaled by a process of calibration to provide a precise readout of the moisture present. The resulting signal can be sent via an analogue (0-20 mA [0-10 v] or 4-20 mA) or RS485 digital communications link to other system components, such as a control module. One example of a microwave moisture sensor is a digital microwave moisture sensor produced by Hydronic® based in Guildford, United Kingdom. The first moisture sensor 112 can be configured to send a signal which represents the moisture content of the material in the vessel 102 to the control module 108. In some embodiments, the moisture of the material in the interior volume at the start of the process is about 4, 5, 6, 7, 8, 9, 10, 11, 12, 13, 14, 15, 16, 17, 18, 19, 20, 21 or 22 percent by weight, or can fall within a range between any of the foregoing.

The vessel 102 can include an opening 114. Material, such as unconditioned feedstuffs and fluid, can be added to the interior volume 110 through the opening 114. The vessel 102 can include an outlet 116. The outlet 116 can be configured to allow material, such as conditioned feedstuffs, to exit the vessel 102. In some embodiments, the outlet 116 can include a valve which can control the rate at which material exits the vessel 102. In various embodiments, the outlet 116 can be located at the bottom of the vessel 102, such that gravity can aid in moving material out of the interior volume 110 through the outlet 116.

In some embodiments, a mixing apparatus 118 can be disposed within the interior volume 110. The mixing apparatus 118 can be configured to mix material within the interior volume to ensure material is homogeneous, such as be ensuring the feedstuffs are sufficiently mixed with the fluid. In some embodiments, the mixing apparatus 118 can include a mechanical mixing element, such as a rotating shaft and blades or paddles. In some embodiments, a motor 148 to generate mechanical force to turn the rotating shaft and/or blades or paddles. In some embodiments, the mixing apparatus 118 can include a recirculation pump.

In some embodiments, other sensors can be included beyond moisture sensors. For example, a weight sensor 152 such as a load cell can be included and can be used by the system, for example, to verify the addition of materials to the vessel 102. In some embodiments, the weight sensor 152 can be used in combination with the first moisture sensor 112. For example, the feedstuffs can be added to the vessel and the total amount weighed, then the moisture sensor (before, during or after mixing) can take a measurement of the moisture content, which can then be compared to a target moisture content. Then a precise amount of fluid to be added can be calculated in order to raise the moisture content to the target moisture content.

Fluid Supply System

The fluid supply system 104 can be configured to add fluid into the interior volume 110 of the vessel 102. The fluid can be mixed with the feedstuffs to increase the moisture content of the feedstuffs. In some embodiments, the fluid can include water.

In some embodiments, the fluid can include water and an additive. The additive can have various properties including acting as one or more of a fortifying agent, a surfactant, a processing aid, a flavoring, a coloring material, a preservative, of the like.

In various embodiments, a saponin containing composition can be added as an additive. By way of example, saponins useful in the present invention may also be extracted in sufficient concentrations from plants of the family: Amaryllidaccae, genus: *Agave*, which grows extensively in the southwestern United States and in Mexico.

Saponins useful in the present invention may also be extracted in sufficient concentrations from plants of the family: Lillaecae, genus: *Yucca*, as well as from *Quillaja saponaria* bark. Saponins may be extracted from plant materials in accordance with techniques well-known by those of skill in the art.

The *Yucca* plant is a wide-ranging genus, which is part of the Century plant family, Aguavacea. Taxonomically there are 30 species within the *Yucca* genus, *Schidigera* being one. The typical saponin content that naturally occurs in *yucca* plants is from 0.1-2% saponins by weight. *Yucca* extracts can be derived by extracting *yucca* powder with an aqueous solution that may or may not contain some fraction of organic solvent such as methanol, ethanol, propanol, butanol, or the like. Commercially available *Yucca* extracts can have a total solids content usually in the range from 5-50%.

The saponin content of a typical 50 brix (50% solids by weight) *yucca* extract is usually in the range of about 1-2% saponins by weight as measured by HPLC analysis. In an embodiment of the invention, the saponin containing composition comprises between about 10-50% (total solids content) *yucca* extract that contains 1-2% saponins by weight as measured by HPLC analysis. Another method of measuring total saponin content is the extraction of all soluble components into a butanol extract followed by gravimetric analysis of the compounds dissolved in the butanol fraction. Measuring saponin content by the butanol extract method typically results in higher numbers than the more advanced HPLC method. Accordingly, the typical 50 brix (50% solids by weight) *yucca* extract is usually in the range of about 5-20.0% saponins content by weight as measured by the butanol extract method.

In an embodiment, the saponin containing composition used in accordance with the invention comprises at least 0.1% by weight saponins as measured by HPLC. In an embodiment, the saponin containing composition used in accordance with the invention comprises at least 0.5% by weight saponins as measured by HPLC. In a particular embodiment, the saponin containing composition used in accordance with the invention comprises at least 1.0% by weight saponins as measured by HPLC. It is believed that the effects of the composition are related to the total amount of saponins present. Thus, one of skill in the art will appreciate that if a certain amount of saponins is desired it can be achieved either through varying the volume of a certain concentration composition administered, varying the concentration of a certain volume of a composition, or both.

An exemplary liquid form of a saponin containing composition is sold under the trademark SARTEMP® by SarTec Corporation of Anoka, Minnesota. It is prepared by blending an aqueous extract of the plants of the family: Lillaecae, genus: *Yucca*, or other appropriate *Yucca* plants containing 10% solids with antifreeze agents such as calcium chloride, propylene glycol, n-propanol, glycerine, sodium chloride, potassium chloride, and the like, to depress the freezing point to −30° F. Antifreeze can allow the composition to be stored outside in the winter. The final concentration of *Yucca* soluble solids is 8.25%. Its physical data are:

| | |
|---|---|
| Bulk Density | 10.4 lbs. per gallon |
| Color | Dark brown |
| Freezing Point | −30° F. |
| PH | 5.5-6.0 |
| Total solids | 33% |
| Water | 67% |

For some applications herein, this liquid material can be applied at the rate of 1-15 fluid ounces or about 12 to 185 grams (dry weight) per ton of particulate. In an embodiment, the fluid added to the feedstuffs or other materials can include about 0.1, 0.2, 0.3, 0.4, 0.5, 0.6, 0.7, 0.8, 0.9, 1.0, 1.2, 1.4, 1.6, 1.8, 2.0, 2.4, 2.8, 3.2, 3.6, 4.0, 5, 6, 7, 8, 10, 12, 15, 20 or 25% by weight additive, or the amount can fall within a range between any of the foregoing.

Other exemplary liquid solutions containing saponins are available commercially and sold under the trademarks SARTEMP®, SARSTART®, SARSTART® PRO, and SARSTART® PLUS by SarTec Corporation of Anoka, Minn. These solutions are prepared by blending an aqueous extract of the plants of the family: Lillaecae, genus: *Yucca*, or other appropriate *Yucca* plants with antifreeze agents such as calcium chloride, sodium chloride, potassium chloride, propylene glycol, glycerine, and the like, to depress the freezing point to approximately −30° F. These liquid solutions may also comprise a variety of other components. By way of example, SARSTART® PLUS can contain the following ingredients: water, propylene glycol, *Yucca schidigera* extract, vitamin E (as di-alpha-tocopheryl acetate), vitamin A propionate, vitamin A palmitate, vitamin B1, vitamin B2, vitamin B6, vitamin B12, D-Activated animal sterol (source of Vitamin D3), naturally occurring organisms, dried egg solids, dried casein, and dried whey. The physical and chemical characteristics of SARSTART® PLUS are as follows: Boiling Point: 240° F.; Specific Gravity: 1; Melting Point: −20° F.; Solubility in Water: Miscible; Appearance and Odor: Dark brown liquid with a mild odor and a slightly acid taste.

The fluid supply system 104 can be connected to a water supply 120. In some embodiments, the water supply 120 can include connection to a water source, such as shown in FIG. 1. In other embodiments, the water supply 120 can include a water storage tank. The water supply 120 can be connected to a water valve 122 which can control the amount and rate of water being added to the interior volume 110 of the vessel.

The fluid supply system 104 can include an additive supply 124. The additive supply 124 can include a tank or storage of additive. The additive supply 124 can also include a pump 150 and/or a control valve to control the amount and rate at which additive is added to the water from the water supply 120.

The fluid supply system 104 can include a fluid control valve 126. The fluid control valve 126 can be configured to control the rate at which fluid is added to the interior volume 110 of the vessel 102. In various embodiments, the fluid control valve 126 can include a mixing element which can mix the fluid to ensure the additive and water are properly mixed. Fluid leaving the fluid supply system 104 can pass through the outlet 128 and into the vessel 102.

In some embodiments, an amount of fluid to be added to the interior volume 110 (or an expected amount) can be calculated prior to prior to the start of any moisture addition. For example, the amount of fluid being added can be calculated based on the amount of the feedstuffs being processed. In some embodiments, the amount of fluid can be calculated based on the amount of the feedstuffs along with the moisture content of the feedstuffs prior to prior to moisture addition (e.g., starting moisture content). In some embodiments, the amount of fluid to be added to the interior volume 110 can be calculated based on the amount of the feedstuffs, the starting moisture content, and the desired moisture content of the feedstuffs after conditioning or mixing the feedstuffs with the fluid.

The fluid supply system 104 can be configured to send or receive signals from the control module 108. In some embodiments, the fluid supply system 104 can receive control signals from the control module 108 related to delivering fluid to the vessel. For example, the fluid supply system 104 can receive a signal from the control module 108 instructing the fluid supply system 104 to supply fluid to the vessel. The signal from the control module 108 can include information regarding the amount of fluid to supply, the rate at which it should be supplied, and the timing of when it should be supplied.

Particulate Material/Feedstuff Material Supply System

The feedstuff supply system 106 can be configured to add a feedstuff into the interior volume 110. The feedstuff supply system 106 can control the rate at which grain is added into the vessel 102 and the amount of feedstuffs that are added into the vessel 102. In some embodiments, the feedstuff supply system 106 can include a delivery mechanism 130, such as a conveyor or a chute which can transport feedstuffs from a location, such as a storage location, to the vessel 102.

In some embodiments, the moisture addition system 100 can include a second moisture sensor 132. The second moisture sensor 132 can be configured to measure the moisture content of feedstuffs prior to entering the vessel 102, such as to calculate the amount of fluid needed to be added to reach a desired moisture content of the feedstuff once it has been mixed with the fluid within the interior volume 110. In various embodiments, the second moisture sensor 132 can include a microwave moisture sensor or a capacitance moisture sensor. The second moisture sensor 132 can be configured to send a signal which represents the moisture content of the feedstuff prior to entering the vessel 102 or prior to being mixed with the fluid. The moisture content of feedstuffs prior to entering the interior volume 110 can be about 4, 5, 6, 7, 8, 9, 10, 11, 12, 13, 14, 15, 16, 17, 18, 19, 20, 21 or 22 percent by weight, or can fall within a range between any of the foregoing. In some embodiments, the feedstuff supply system 106 can be configured to deliver a known amount of the feedstuffs to the interior volume 110, such as a desired weight or volume of grain. The moisture content of feedstuffs after moisture addition with a system herein can be about 12, 13, 14, 15, 16, 17, 18, 19, 20, 21, 22, 24, 26, 28, 30, 32, 34, 36, or 38 percent by weight. In various embodiments, an amount of moisture can be added that is sufficient to raise the moisture content on a percent by weight basis by at least 1, 2, 3, 4, 5, 6, 7, 8, 9, 10, 11, 12, 13, 14, 15, 16, 17, or 18 percentage points (for example, wherein changing the moisture content of a particulate from 14 wt. % to 22 wt. % represents a change of 8 percentage points), or by an amount falling within a range between any of the foregoing.

The feedstuff supply system 106 can be configured to send or receive signals from the control module 108. In some embodiments, the feedstuff supply system 106 can receive control signals from the control module 108 related to delivering feedstuffs to the vessel. For example, the feedstuff supply system 106 can receive a signal from the control module 108 instructing the feedstuff supply system 106 to supply feedstuff to the vessel. The signal from the control module 108 can include information regarding the amount of feedstuff to supply, the rate at which it should be supplied, and the timing of when it should be supplied.

Control Module

Control modules herein can include various elements to execute operations and/or receive inputs or signals from sensors and buttons and then generate output signals such as to control valves, motors, pumps, display screens and the like. Control module components can include components such as application specific integrated circuits (ASICs), microprocessors, microcontrollers, programmable logic controllers (PLCs), and the like.

The control module 108 can be configured to send and/or receive signals from the various components within the moisture addition system 100, such as the vessel 102, the fluid supply system 104, and the feedstuff supply system 106. The control module 108 can be configured to control the fluid supply system 104 and/or the feedstuff supply system 106, such as by sending control signals to the fluid supply system 104 or the feedstuff supply system 106. The control module 108 can monitor the rate and amount of fluid being added to the vessel 102. The control module 108 can control the fluid supply system 104 to control the amount of fluid added to the vessel 102 and the rate at which fluid is added to the vessel 102, such as by controlling the fluid control valve 126. Similarly, the control module 108 can also monitor the rate and amount of the feedstuffs being added to the vessel 102. The control module 108 can control the feedstuff supply system 106 to control the amount of the feedstuffs added to the vessel 102 and the rate at which the feedstuffs are added to the vessel 102.

In some embodiments, the control module 108 can also include a GPS or other geolocation chip or circuit. The control module 108 can log its position at various time points, such as at the start or conclusion of various processing steps described herein.

In various embodiments, the control module 108 can be configured to receive a signal from the first moisture sensor 112 regarding the moisture content of the material within the vessel 102. The control module 108 can change or adjust the addition of fluid to the vessel 102 based on the received signal from the first moisture sensor 112. In some embodiments, the control module 108 can be configured to control the fluid supply system 104 to increase or decrease the rate at which fluid is being added to the vessel 102, or increase or decrease the total amount of fluid being added to the vessel 102.

The control module 108 can compare the actual moisture content of the material in the interior volume 110 at a specific time point to an expected moisture range or a predicted moisture range at the same time point. The predicted moisture range can be an estimated or calculated range of moisture that is expected and/or acceptable for the material to be within given the time point in the overall moisture addition or conditioning process. The predicted range can vary over time considering the contents that are being added to the vessel. The control module 108 can determine when the moisture content of the material is not within the predicted range. The predicted moisture range can be based off of the systems previous batches of conditioning the feedstuffs, such that the control module 108 can track the moisture content of the material as fluid and/or feedstuffs are added to a vessel and predict how future batches of material are likely to react.

The predicted moisture range can include a high moisture limit and a low moisture limit. The intended moisture of the material inside the vessel 102 can be intended to be below the high moisture limit and above the low moisture limit. The high moisture limit and the low moisture limit can increase over time as fluid is added to the vessel 102.

In some embodiments, the magnitude of the gap between the high moisture limit and the low moisture limit can decrease as time passes and as the process nears the end. This can promote accurately finishing at the precise desired moisture content. In some embodiments, the magnitude of the gap between the high moisture limit and the low moisture limit can contract by at least 5%, 10%, 20%, 30%, 40%, 50%, 80%, or 90% over the time span of the moisture addition process. In some embodiments, the high moisture limit can increase over time until it hits the target moisture amount and then can remain at the target moisture amount until the end of the moisture addition process (in that way the high moisture limit may never rise above the target moisture amount).

However, in some embodiments, the magnitude of the gap between the high moisture limit and the low moisture limit can remain substantially constant throughout the moisture addition process.

In various embodiments, the rate or amount of fluid or feedstuffs being added to the vessel 102 can be changed. Changes to the rate or amount of fluid or grain being added to the vessel 102 can affect the predicted moisture range, such as changes as a result of the measured moisture content being outside of the predicted moisture range. For example, if the rate at which fluid is being added is decreased, the predicted moisture content of the materials within vessel 102 can be decreased to account for the decreased rate of fluid being added.

In some embodiments, the control module 108 can include a user interface 134. The user interface 134 can display information to a user, such as the predicted moisture content and measured moisture content graphs shown in FIGS. 4-9. In an embodiment, the control module 108 can calculate a predicted end time the feedstuff conditioning process will be completed. The user interface 134 can display the estimated time of completion. The estimated time of completion can be displayed as an actual time (such as "3:46 PM") or it can be displayed in terms of remaining time (such as "14 Minutes"), or it can be displayed both ways. This information can be uniquely valuable in a batch processing mode because it can allow a system operator to know when they might need to take further actions such as removing the contents of the batch and/or starting a new batch. In various embodiments, the predicted end time can be updated or changed based on changes in the addition fluid or feedstuffs to the interior volume 110. In some embodiments, the control module 108 can adjust the estimated completion time based on the measured moisture content within the vessel being outside of the predicted range.

Figure 5:
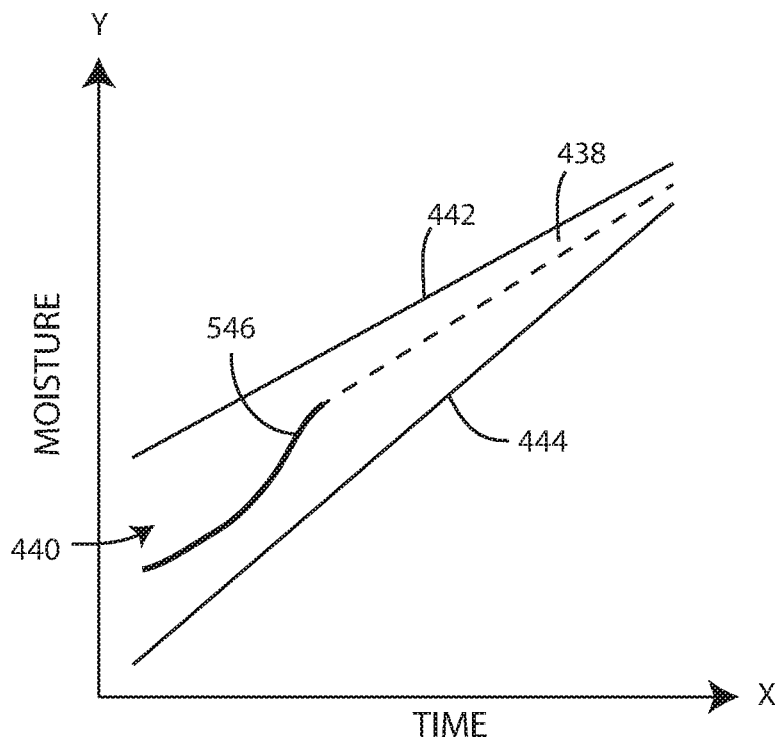
FIG. 5 is a schematic diagram of the moisture content within the vessel, according to an embodiment.
Figure 6:
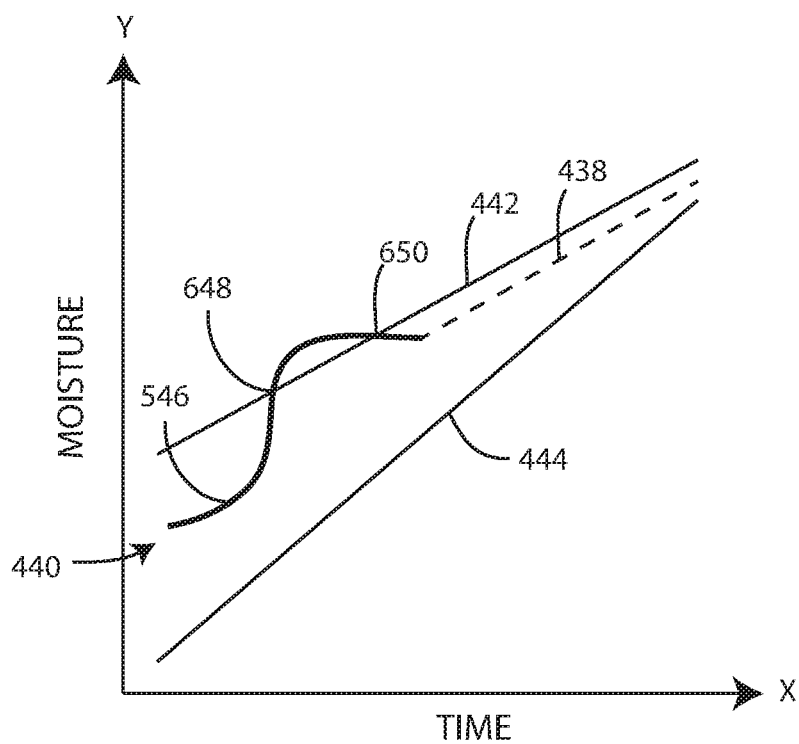
FIG. 6 is a schematic diagram of the moisture content within the vessel, according to an embodiment.
Figure 7:
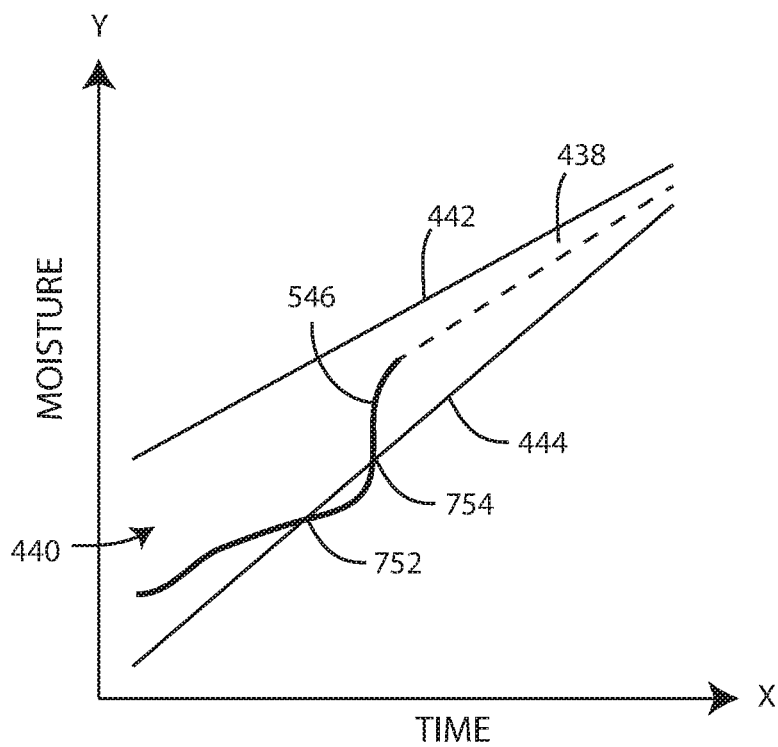
FIG. 7 is a schematic diagram of the moisture content within the vessel, according to an embodiment.

The user interface 134 can display additional information, such as an estimated time when adding fluid or feedstuffs to the vessel 102 will be completed or an estimated amount of time remaining until the conditioning process will be completed. The user interface 134 can display measured values of the moisture content of within the vessel 102, such as shown in FIGS. 5-7.

In some embodiments, the control module 108 can enter a warning state, such as if the measured moisture content of the material in the interior volume 110 is out of the predicted moisture range. The user interface 134 can display a message regarding the warning state. The user interface 134 can also display other warning messages, such as if the amount of water or additive in a storage tank is running low, or if the fluid flow from the outlet 128 is not at an expected rate, such as caused by a faulty pump, a faulty valve, or a clog in the system.

In some scenarios, the warning state can be a result of the moisture content in the vessel 102 being greater than the predicted range of moisture content, such as being greater than the high moisture limit. In response, the control module 108 can decrease the rate at which the fluid supply system 104 is adding fluid to the vessel 102, or the control module 108 could increase the rate at which the feedstuff supply system 106 is adding feedstuffs to the vessel 102.

In other scenarios, the warning state can be a result of the moisture content in the vessel 102 being less than the predicted range of moisture content, such as being less than the low moisture limit. In response, the control module 108 can increase the rate at which the fluid supply system 104 is adding fluid to the vessel 102, or the control module 108 could decrease the rate at which the feedstuff supply system 106 is adding feedstuffs to the vessel 102.

Figure 2:
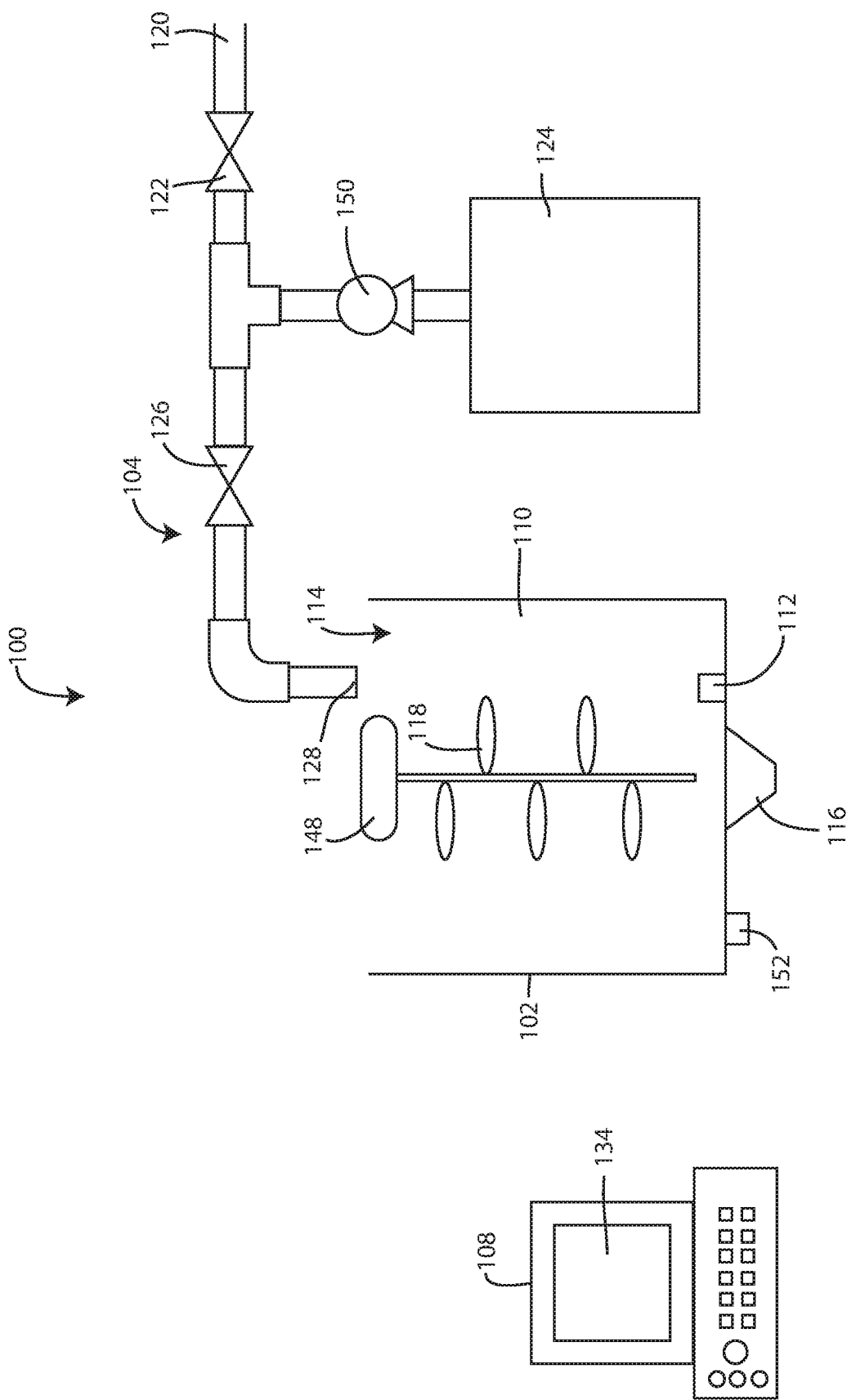
FIG. 2 is a schematic view of a moisture addition system, according to an embodiment.

FIG. 2 shows a schematic view of a moisture addition system 100. The moisture addition system 100 shown in FIG. 2 includes a vessel, a fluid supply system, and a control module. Similar to the embodiment shown in FIG. 1, the control module 108 can be configured to monitor the moisture content of material in the vessel 102 with a first moisture sensor 112.

In some embodiments, such as the embodiment shown in FIG. 2, the entire amount of feedstuffs can be deposited into the interior volume of the vessel 102 prior to adding any fluid to the vessel 102. In some embodiments, the feedstuffs can be mixed and then the moisture can be measured with moisture sensor 112 prior to any fluid being added to the vessel 102. The outlet 116 can be closed to ensure the feedstuffs do not exit the vessel 102 while the fluid is being added and the material is being mixed.

The control module 108 can be configured to adjust or change the fluid supply system 104 in response to the moisture content within the vessel 102 varying from the predicted moisture range. For example, if the moisture content within the vessel 102 is below the predicted moisture range, the control module 108 can increase the fluid input from the fluid supply system 104. In contrast, if the moisture content within the vessel is above the predicted moisture range, the control module 108 can decrease or terminate fluid input from the fluid supply system 104 until the measured moisture content returns to the predicted moisture range.

Figure 3:
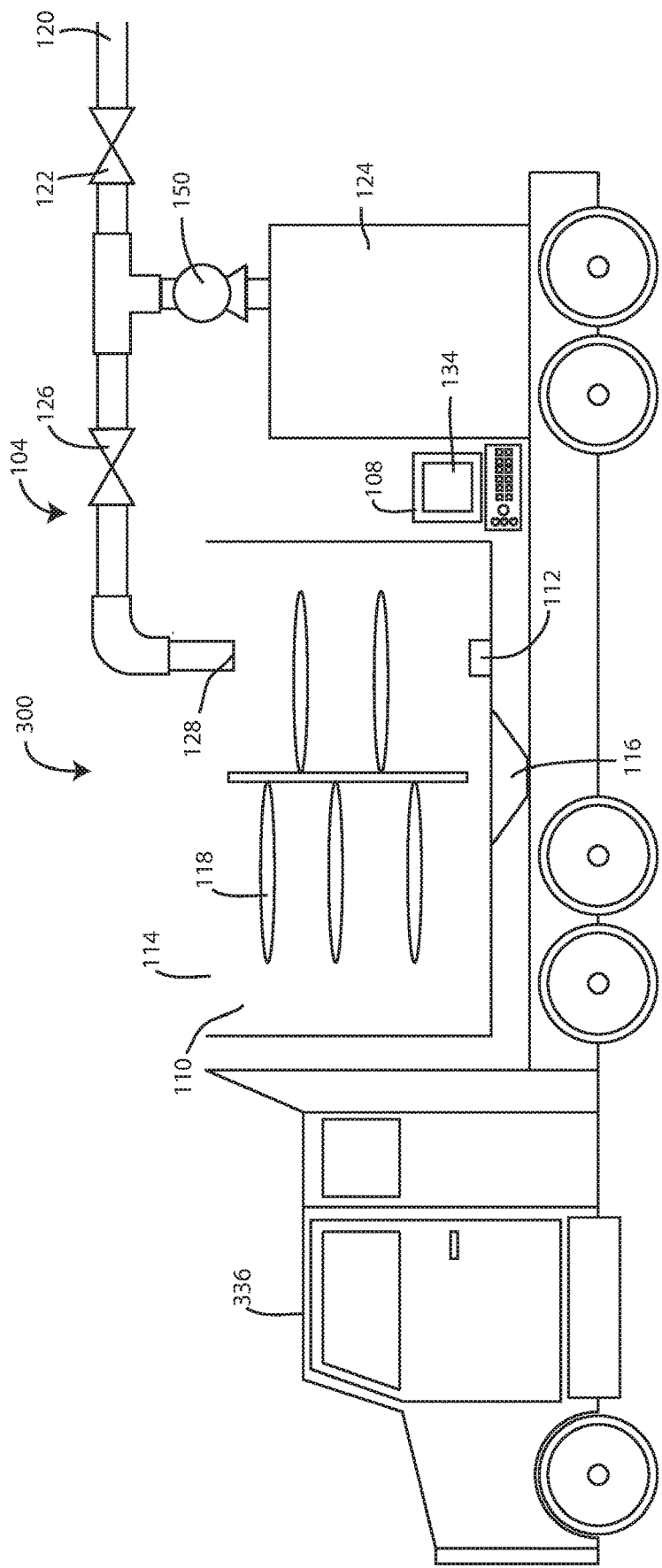
FIG. 3 is a schematic view of a mobile moisture addition system, according to an embodiment.

FIG. 3 shows a schematic view of a mobile moisture addition system 300, according to an embodiment. In some embodiments, the moisture addition system 300 can include a motor vehicle 336. The mobile moisture addition system 300 can include some or all of the components described with respect to FIGS. 1 and 2, but on a mobile platform. Similar to the embodiment shown in FIG. 2, the mobile moisture addition system 300 can include a vessel 102, a fluid supply system 104, and a control module 108. The control module 108 can control the fluid supply system 104 in response to the moisture content within the vessel 102 varying from the predicted range. The vessel 102, the fluid supply system 104, and the control module 108 can be mounted on the motor vehicle 336, such that the moisture addition system 300 can be easily transported from one location to another. In various embodiments, the vessel 102 can remain mounted on the motor vehicle 336 while feedstuffs within the vessel 102 are being conditioned. In some embodiments, the mobile moisture addition system 300 can also include a scale in order to capture the weight of the vessel 102 and the contents therein.

Figure 4:
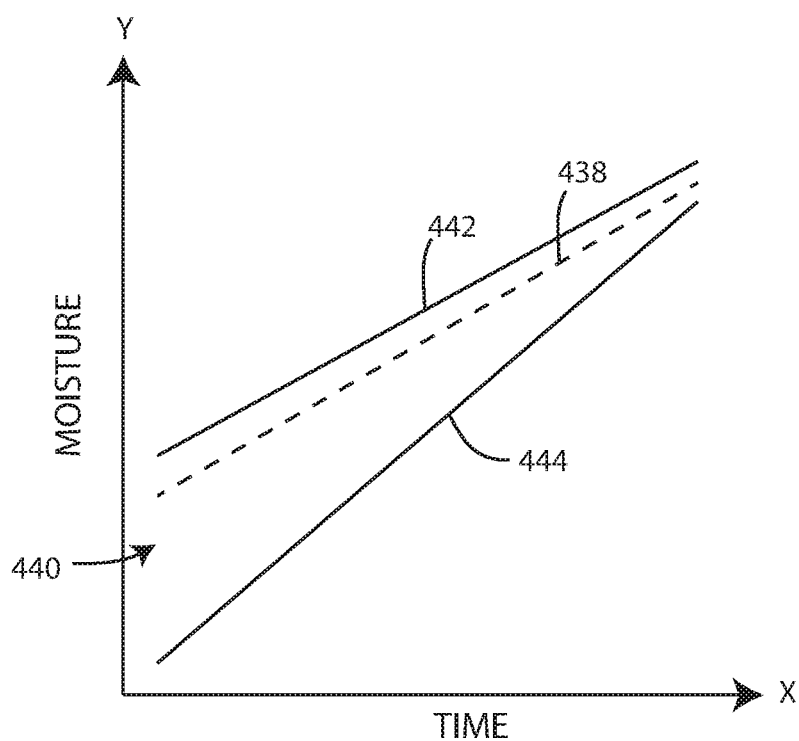
FIG. 4 is a schematic diagram of the moisture content within the vessel, according to an embodiment.

FIG. 4 shows a schematic diagram of the predicted moisture content within the vessel, according to an embodiment. The moisture addition system can monitor the moisture level of the material within the vessel and vary one or more inputs into the vessel to maintain the moisture level of the material within a desired or predicted range. The x-axis represents time and the y-axis represents moisture content. The moisture addition systems described herein are used to increase moisture content, as such it is expected that the moisture content will generally increase over time, unless the process is paused or stopped.

The predicted or expected moisture content for material within the vessel can be represented by the dashed line 438. Further, the predicted moisture content (see dashed line 438) can generally be located within an acceptable predicted moisture content range 440 that is based on the predicted moisture content. The predicted or expected moisture content range 440 can include a high moisture limit 442 and a low moisture limit 444. As described above, in some embodiments these limits can converge over time. In some embodiments, if the measured moisture content is not within the predicted moisture content range 440, the control module can be configured to enter a warning state, such as to alert a user that a potential problem might exist. In some embodiments, if the measured moisture content is not within the predicted moisture content range 440, the control module can be configured to adjust an input to the vessel in order to get the moisture content back within the predicted moisture content range 440.

The predicted moisture content graph, shown in FIG. 4, can predict when the conditioning process will be completed. The control module can display the estimated completion time of the addition of fluid or the completion of the conditioning process. If the material does not respond to the conditioning process in the predicted manner, the control module can adjust the estimated time of completion based on the measured moisture content and adjustments made to the system. The control module can be configured to adjust or update the estimated time of completion in response to changes that were made to the system based on the moisture content being outside of the predicted moisture range.

FIG. 5 shows a schematic diagram of the moisture content within the vessel during the conditioning of the feedstuff, according to an embodiment. The graph shown in FIG. 5 shows a moisture addition system that is partially through a batch. The solid line 546 represents the measured moisture content of the material within the vessel. The dashed line 438 is the predicted moisture content of the material.

In some embodiments, the predicted moisture content can be updated or recalculated during the conditioning of a batch based on a measured moisture content. For example, if the measured moisture content is higher than the predicted moisture content, the predicted moisture content for the remaining portion of the conditioning process can be recalculated to a higher amount to account for how the moisture content of the current batch of feedstuffs are acting.

FIG. 6 also shows graph of the moisture content of the material within a vessel in a partially completed batch. The graph shown in FIG. 6 shows that the moisture content within the vessel surpassed the high moisture limit 442 at point 648. Then the moisture content returns within the predicted moisture content range 440 at point 650. In some embodiments, the control module can enter a warning state at point 648, because the moisture content surpassed the high moisture limit 442 and is no longer within the predicted moisture range.

The control module can take various actions in response to the moisture content surpassing the high moisture limit. For example, the control module can decrease the fluid input in order to return the moisture content to within the predicted range, such as by controlling the fluid control valve. The control module can also increase the feedstuff input in addition to or instead of decreasing the fluid input. Similarly, the control module can take various actions in response to the moisture content falling below the low moisture limit such as increasing the fluid input and/or decreasing the feedstuff input. In various embodiments, the control module can be configured to adjust inputs into the vessel in order to correct deviations of the measured moisture content from the predicted moisture content.

FIG. 7 shows an additional graph of the moisture content of the material within a vessel in a partially completed batch. The graph shown in FIG. 7 shows that the moisture content within the vessel fell below the low moisture limit 444 at point 752 and returns within the predicted moisture content range 440 at point 754. In some embodiments, the control module can enter a warning state at point 752, because the moisture content fell below the low moisture limit 444. The control module could have increased the fluid input in order to return the moisture content to within the predicted range, such as by controlling the fluid control valve. The control module could have also decreased the feedstuff input in addition to or instead of increasing the fluid input.

Figure 8:
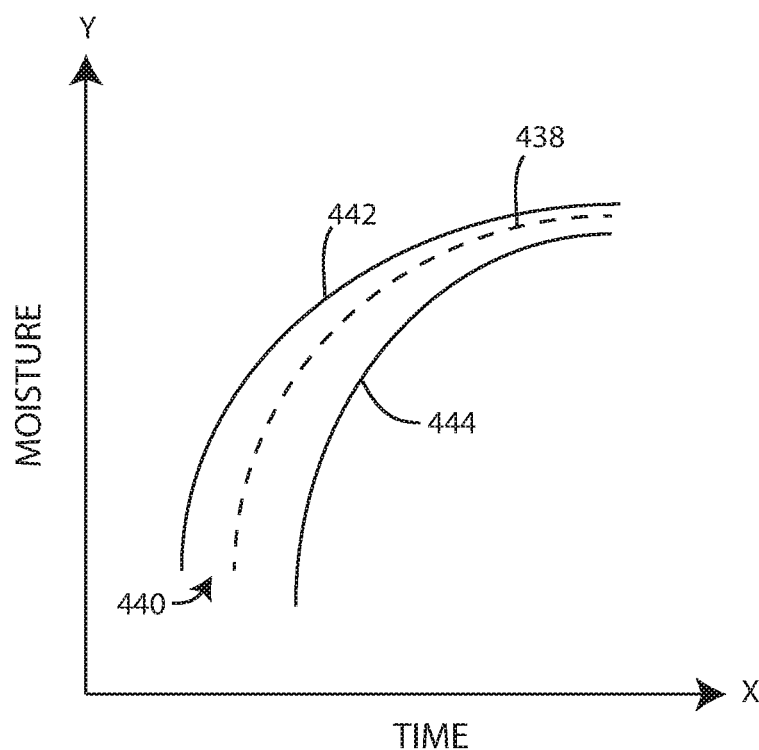
FIG. 8 is a schematic diagram of the moisture content within the vessel, according to an embodiment.

FIG. 8 shows a schematic diagram of the predicted moisture content within the vessel, according to an embodiment. In some embodiments, the predicted moisture content within the vessel can increase at a non-linear rate, such as shown in FIG. 8. In other embodiments, the predicted moisture content within the vessel can increase at a linear rate, such as shown in FIGS. 4-7.

Figure 9:
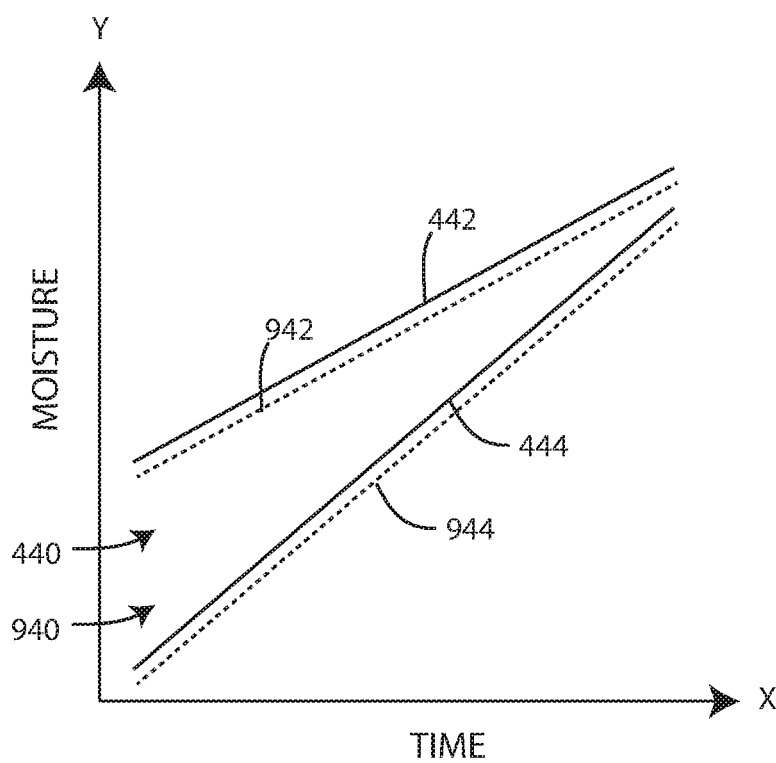
FIG. 9 is a schematic diagram of the moisture content within the vessel, according to an embodiment.

In various embodiments, the control module can use measurement information gained in previous batches to update the predicted moisture content within the vessel. For example, if the previous batch had a lower than expected moisture content throughout the conditioning process, the control module can lower the predicted moisture content range to account for the trend. FIG. 9 shows a first predicted moisture content range 440 with a high moisture limit 442 and a low moisture limit 444, and a second predicted moisture range 940 with a high moisture limit 942 and a low moisture limit 944. The second predicted moisture range 940 can be lower than the first prediction moisture content range 440. In other embodiments, the second predicted moisture range 940 can be higher than the first predicted moisture content range 440, such as when previous batches have had a higher than predicted moisture range. FIG. 9 is a schematic diagram of the moisture content within the vessel, according to an embodiment.

Figure 10:
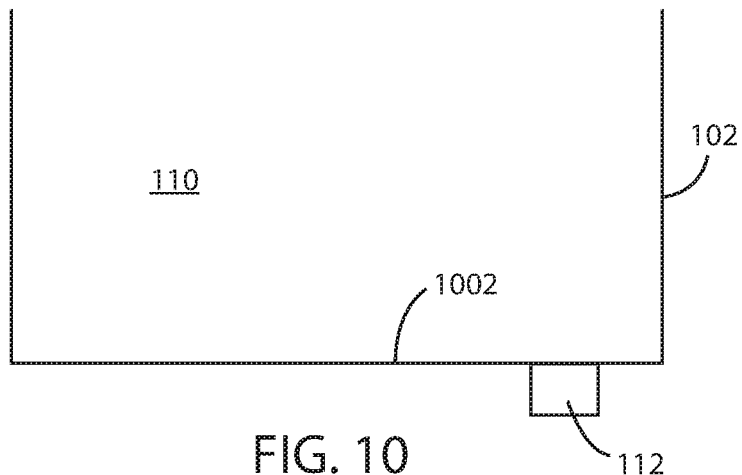
FIG. 10 is a schematic view of the placement of a moisture sensor within a vessel in accordance with various embodiments herein.
Figure 11:
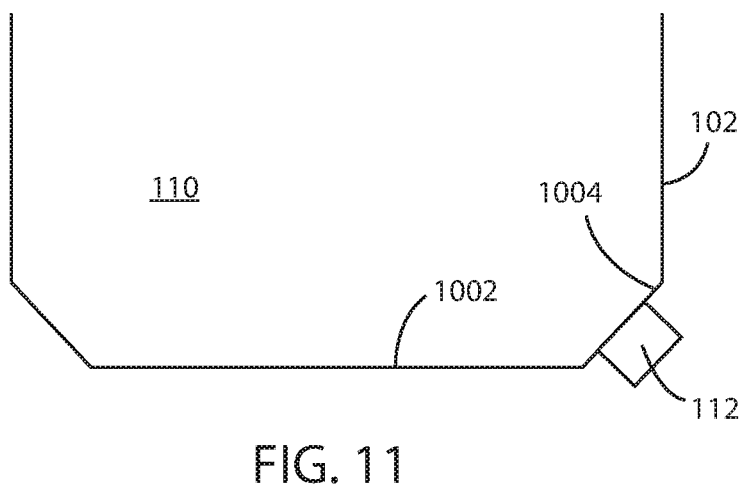
FIG. 11 is a schematic view of the placement of a moisture sensor within a vessel in accordance with various embodiments herein.
Figure 12:
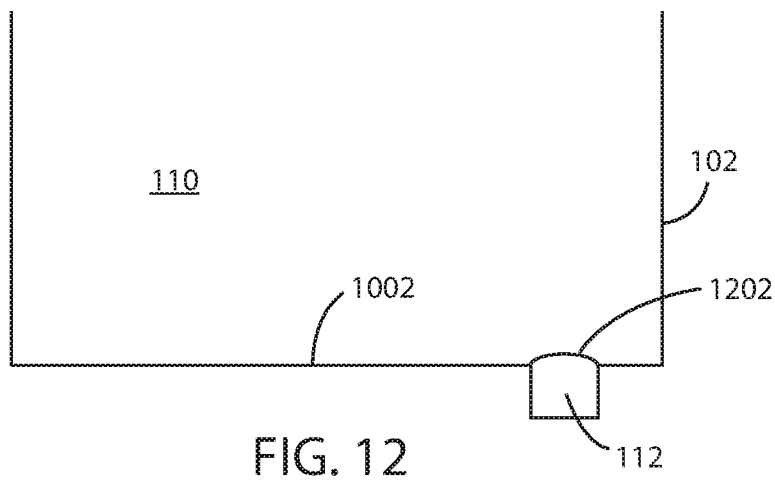
FIG. 12 is a schematic view of the placement of a moisture sensor within a vessel in accordance with various embodiments herein.

Moisture sensors and, in particular, microwave based moisture sensors can be mounted to measure moisture content within the vessel in various ways. In some embodiments, the moisture sensor can be mounted so as to be flush with an inner surface of the vessel 102. Referring now to FIG. 10, a schematic view is shown of the placement of a moisture sensor 112 within a vessel 102 in accordance with various embodiments herein. In this example, the moisture sensor 112 is mounted so that a top surface thereof is mounted flush with a bottom wall 1002 of the vessel 102. In some embodiments, the moisture sensor is mounted adjacent to the bottom of the vessel but not specifically at the bottom most portion of the vessel. As a percentage of the overall height of the vessel, the moisture sensor can be mounted so as to be within the bottom 40%, 30%, 20%, 15%, 10%, or 5% of the vessel. Rather, the moisture sensor can be mounted on a curved or angle portion adjacent to the bottom most wall of the vessel. Referring now to FIG. 11, a schematic view is shown of the placement of a moisture sensor 112 within a vessel 102 in accordance with various embodiments herein. In this example, the moisture sensor 112 is mounted so that a top surface thereof is mounted flush with an angled wall portion 1004 that is adjacent to the bottom wall 1002 of the vessel 102. While not intending to be bound by theory, it is believed that this position which is slightly above the bottom most portion of the vessel provides more accuracy because sensors at the bottom most surface of the vessel may be influenced by liquid that is added to the vessel, but not yet absorbed and which may temporarily pool at the bottom of the vessel before full absorption. In some embodiments, the moisture sensor 112 may not have a flat top surface, but can be domed or otherwise shaped or curved. Referring now to FIG. 12, a schematic view is shown of the placement of a moisture sensor 112 within a vessel 102 in accordance with various embodiments herein. In this example, the moisture sensor 112 is mounted along a bottom wall 1002 of the vessel 102. The moisture sensor 112 includes a domed or curved top surface 1202.

Methods

Figure 13:
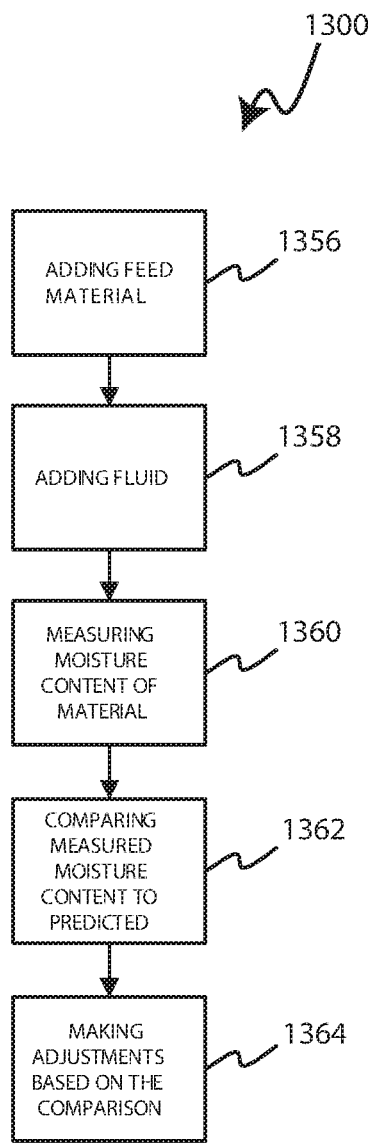
FIG. 13 is a flow chart showing a method of conditioning grain, according to an embodiment.

Various methods are included herein. In some embodiments, a method of adding moisture to a feedstuff material is included. In some embodiments, a method of operating a moisture addition system is included. FIG. 13 shows a flow chart showing a method 1300 of conditioning feedstuffs, according to an embodiment.

In some embodiments, the method 1300 can include adding feedstuffs to the interior volume of the vessel 1356. In some embodiments, at least a portion of the feedstuffs can be added at the same time as at least a portion of the fluid is being added. In other embodiments, the feedstuffs are added to the vessel prior to any fluid being added to the vessel.

The method 1300 can include adding fluid to an interior volume of a vessel 1358. In various embodiments, a fluid supply system controls the rate and/or amount of fluid being added to the vessel. The fluid can contain water and one or more additives such as those described above. In some embodiments, the total amount of fluid to be added to the vessel can be calculated prior adding any fluid to the vessel, such as based on the amount of the feedstuffs that the fluid will be mixed with, the initial moisture content of the feedstuffs, and a desired moisture content of the feedstuffs.

The method 1300 can include measuring the moisture content of the material within the vessel 1360. In various embodiments, the moisture content is measured with a microwave sensor. The measured moisture content can be compared to a predicted moisture content 1362. In some embodiments, the method 1300 can further include adjusting the system based on the comparison of the measured moisture rate to the predicted moisture rate 1364. Adjustments to the system can include adjusting the inputs, such as the fluid supply system and the feedstuff supply system. An additional adjustment can include entering a warning state, such as when the measured moisture content is not within the predicted range. Another adjustment can include adjusting the estimate time of completed the conditioning process. An adjustment can include varying the ratio of water to additive within the fluid. Further adjustments can include modifying predicted values during the conditioning process or modifying predicted values for future batches. As discussed above, the predicted moisture rate can include a predicted range of moisture content, which can include a high moisture limit and a low moisture limit. If the measured moisture content is not within the predicted range of moisture content, the method 1300 can include entering a warning state and/or adjusting the inputs to the vessel to return the moisture content to within the predicted range.

Systems and methods for adding moisture, and in some cases additives with the moisture, to feedstuff materials such as grains, other feedstuffs, and total mixed rations are described herein. Materials to which moisture can be added can include grains and specifically feed grains. Materials to which moisture can be added can include, but are not limited to, corn, wheat, millet, milo (grain sorghum), oats, barley, rye, spelt, triticale, amaranth, buckwheat, rice, soybeans, sunflower seeds, other oil seeds. Materials to which moisture can be added can also include forage materials including, but not limited to hay, sillage, stover, and the like. Other materials can include other types of plant matter besides those described above, other natural particulates, synthetic particulates, mineral based particulates, other byproduct animal feed materials such as molasses, beet pulp, distillers grains, brewers grains, corn gluten feed, and the like. In various embodiments, materials here can specifically include components of a total mixed ration. Details regarding total mixed rations are described in greater detail below.

Total Mixed Ration

In some cases, animals may be feed with a total mixed ration (TMR). A total mixed ration is the result of weighing and blending all feedstuffs into a complete ration which provides adequate nourishment for a given animal and may be their sole source of feed. The total mixed ration for an animal can include forage materials, grains, protein supplements, other feed supplements, minerals, vitamins, and the like. When all the ingredients are mixed together, an animal is less able to select individual ingredients (sorting) and therefore more likely to get a balanced ration with each bite. The use of a TMR can also promote the ability to feed a variety of different feedstuffs that animals may not eat if fed individually.

TMRs can be formulated based on the calculated total nutritional needs of the animal in combination with the types of feedstuffs that are available in a given area at a given point in time. Control of moisture content of a TMR is extremely important because of its impact on the total energy provided by a given weight of food material. All other things being equal, a TMR having a moisture content of 40% by weight has more energy and nutrients per pound than a TMR having a moisture content of 60% by weight. If animals are always fed a given amount of a TMR as measured by weight, since moisture content provides no calories or nutrients, it can be seen that feeding an animal a TMR that has a moisture content too high will result in under-nourishment of the animal whereas feed an animal a TMR that has a moisture content too low will result in over-nourishment of the animal. Both under-nourishment and over-nourishment are extremely bad for the health and productivity of animals.

In practice, after a TMR is formulated for a group of animals, the ingredients can be weighed and then mixed together. Mixing time can vary based on factors such as the mixer-type, the total amount of feed in the mixer, mixer condition, etc. The mixed TMR can be deposited in a feed bunk (such as a fence-line bunk) daily, twice daily, or at a greater frequency. In some embodiments, mixing can take place in a mobile unit (such as a feed wagon or mix truck) that can perform mixing while moving between the area where it receives its load and the location of the feed bunks (or other structure) into which the TMR is placed for the animals to feed on.

As a part of the TMR preparation process, moisture content of the TMR can be adjusted. In some cases, TMR formulations that are too dry can result in an undesirable degree of sorting by the animals. In various embodiments, the TMR can be between 20 and 80 percent moisture, or between 30 and 60 percent moisture, or between 40 and 60 percent moisture, or between 45 and 55 percent moisture, or between 30 and 40 percent moisture. In various embodiments, the TMR can have a moisture content of about 20, 25, 30, 35, 40, 45, 50, 55, 60, 65, 70, 75 or 80 percent moisture or an amount falling within a range between any of the foregoing.

TMR can have a particle size distribution that is optimal for the animals. A piece of equipment known as the Penn State Particle Size Separator (PSPSS), which is essentially a three-sieve system with apertures of 19 mm, 8 mm, and 1.18 mm, can be used to assess the particle size distribution of a TMR. In some embodiments, using a PSPSS, the TMR can include 3 to 8 percent of feed on the top screen (X>19 mm), 30 to 50 percent of feed on the middle screen (19 mm>X>8 mm), 30 to 50 percent of feed on the lower screen (8 mm>X>1.18 mm), and less than 20 percent of feed (the smallest particles) on the bottom pan (X<1.18 mm).

Systems and apparatus herein can be used in the preparation of a TMR. In particular, systems and apparatus herein can be used to accurately measure moisture content in a TMR, and adjust the same, despite variations in the moisture content of feedstuff inputs and despite the presence of free moisture allowing for extremely consistent TMR batches and therefore extremely consistent energy and nutrition uptake by animals for enhance productivity and health of such animals.

Systems with Batch Boxes

In various embodiments, systems herein can also include the use of other components including, but not limited to, batch boxes and/or standalone mixers. A batch box is a container into which ingredients for a TMR batch can be loaded. The volume of the batch box can be sufficiently large for all components of a truckload of TMR. The contents of the batch box can be dumped into a feed truck, mixer-wagon, or other apparatus with a mixing capability all at once.

Figure 14:
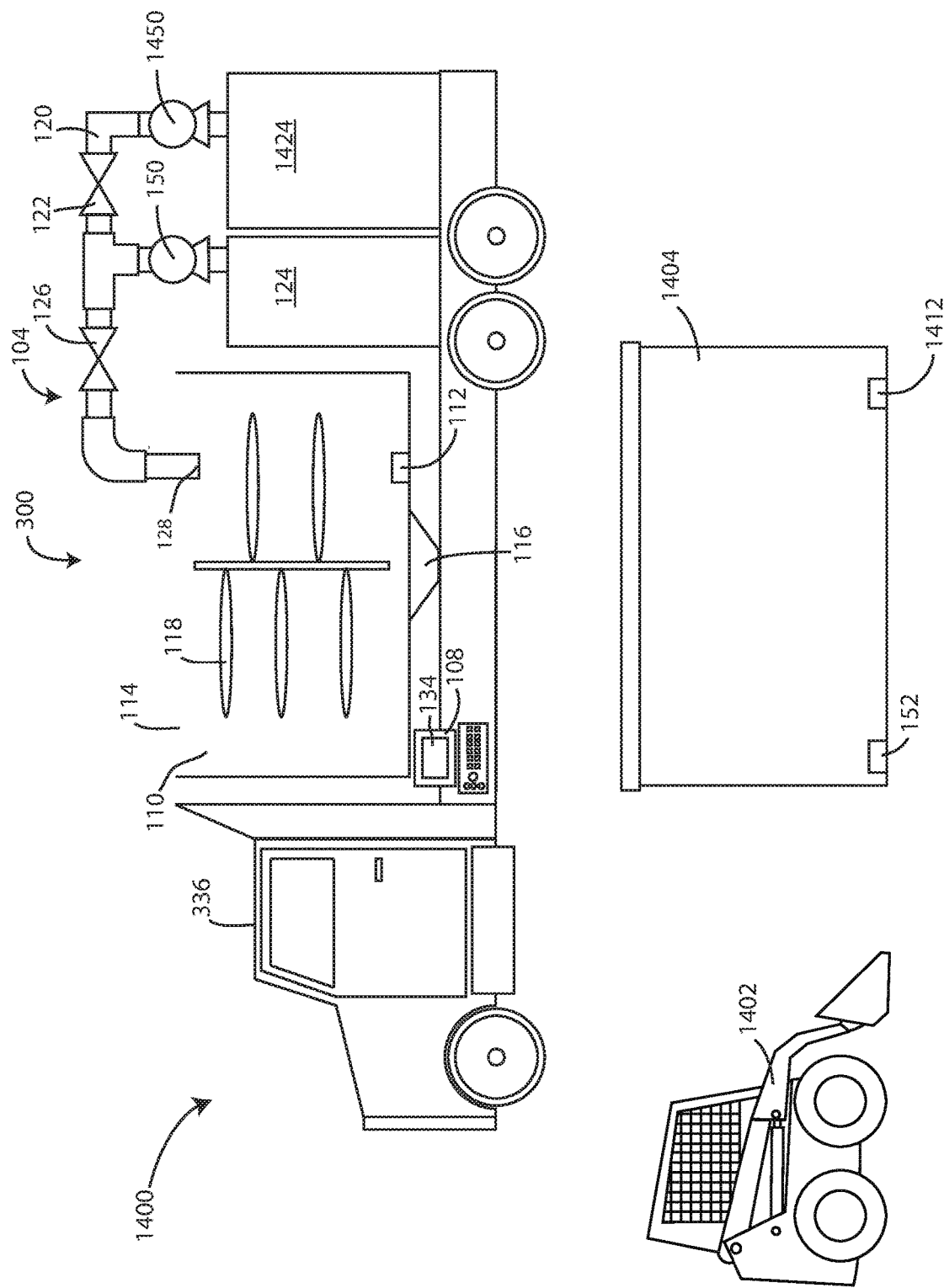
FIG. 14 is a schematic diagram of a moisture addition system in accordance with various embodiments herein.

Referring now to FIG. 14, a schematic view is shown of a system 1400 including a batch box 1404 in accordance with various embodiments herein. The system 1400 can include a mobile moisture addition system 300 (or mobile unit). The mobile unit can include elements as described previously herein. In some embodiments, the mobile unit can also include a water supply tank 1424 and water pump 1450.

In some embodiments, components such as components of a TMR in sufficient quantities for a particular batch can be loaded into a batch box 1404. By way of example, a loader 1402 (skid steer, front end loader, or the like) can be used to take ingredients in specific amounts and then be deposited into the batch box 1404. After all ingredients are deposited into the batch box 1404, they can then be put into a device with mixing capability, such as the mobile moisture addition system 300. In various embodiments, the feedstuffs forming a TMR are initially placed into the batch box 1404 and then transferred into the mobile moisture addition system 300. Operations of mixing and moisture addition can then take place within the mobile moisture addition system 300, such as while the mobile moisture addition system 300 is moving. In some embodiments, the batch box 1404 can include a moisture sensor 1412 therein (such as any of the types of moisture sensors described herein). However, in some embodiments, a moisture sensor may be omitted from the batch box 1404.

In some embodiments, other sensors can be included in the batch box 1404 other than moisture sensors. For example, a weight sensor 152 such as a load cell can be included and can be used by the system, for example, to verify the addition of materials to the batch box 1404 and/or to aid in calculations of how much fluid needs to be added to raise moisture content to a target level. In some embodiments, the weight sensor 152 can be used in combination with a moisture sensor 1412. For example, the feedstuffs can be added to the batch box and the total amount weighed, then the moisture sensor can take a measurement of the moisture content, which can then be compared to a target moisture content. Then a precise amount of fluid needed for the batch can be calculated in order to raise the moisture content to the target moisture content.

Mobile Scenarios with TMR Mixing

As referenced above, in some embodiments, mixing can take place in a mobile unit (such as a mobile moisture addition system, feed wagon, feed truck, mix truck or other mobile device with mixing capabilities) that can perform mixing while moving between the area where it receives its load of feed and the location of the feed bunks (or other structure) into which the TMR is placed for the animals to feed on.

Figure 15:
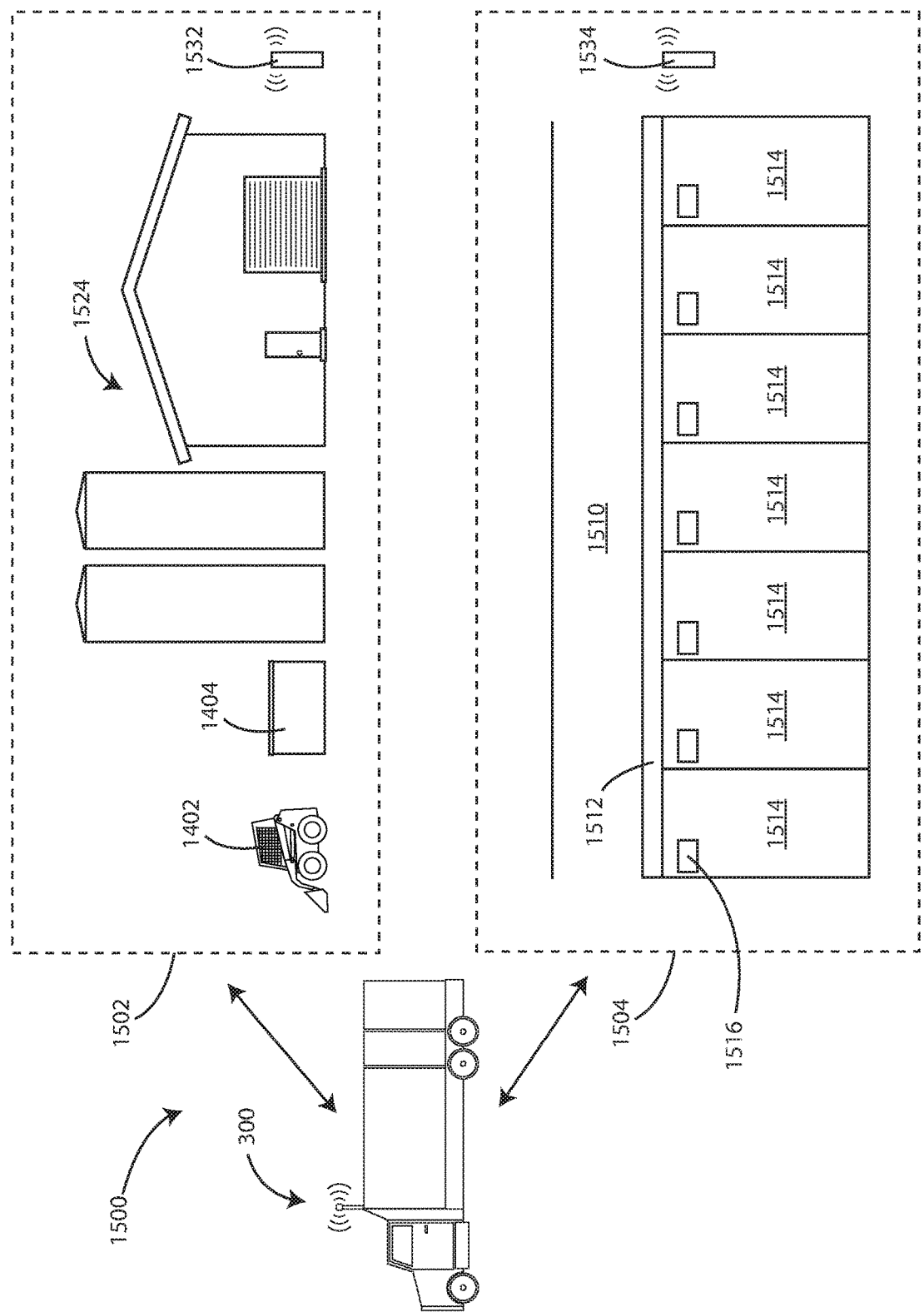
FIG. 15 is a schematic diagram of a moisture addition system in accordance with various embodiments herein.

Referring now to FIG. 15 is a schematic diagram of a moisture addition environment 1500 in accordance with various embodiments herein. In a first area 1502 (or feed supply area or base area), feed materials can be stored at least temporarily in feed storage structures 1524. Periodically, the mobile unit 300 can travel to the first area 1502 and receive a batch of feedstuffs that will make up a TMR. In some embodiments, the presence of the mobile unit 300 at the first area 1502 or base area can be detected and logged using a first proximity sensor 1532 and/or using a GPS or other geolocation sensor associated with the mobile unit 300 itself. In various embodiments, a first moisture measurement can be made while the mobile unit 300 is at the first area 1502. In various embodiments, moisture measurements can be made while the mobile unit 300 is at the first area 1502 and after it has received a load of feedstuff materials and/or after it has received a load of feedstuff materials and an initial amount of a moisture content altering fluid (such as water and an additive described herein).

The mobile unit 300 can then move to an animal containment area 1504. In some embodiments, mixing can be performed while the mobile unit is moving between the first area 1502 and the animal containment area 1504. The animal containment area 1504 can include a plurality of pens 1514, in some cases with water troughs 1516 therein. The animal containment area 1504 can further include a feed bunk(s) 1512 into which the mobile moisture addition system 300 can deposit TMR allotments. The animal containment area 1504 can further include a feed alley through with the mobile moisture addition system 300 can pass when dropping off TMR allotments into the feed bunk(s). In some embodiments, the presence of the mobile unit 300 at the animal containment area 1504 can be detected and logged using a second proximity sensor 1534 and/or using a GPS or other geolocation sensor associated with the mobile unit 300 itself.

In some embodiments, measurements of moisture can be performed after mixing has been performed and before the feed material is deposited into the feed bunk(s). Various steps can be taken to account for the moisture of the feed material (such as a TMR) that is not as targeted. In some embodiments, the moisture content can be further adjusted in the field (such as additional dry material or additional fluid can be used to "top off" the batch and get the total moisture content closer to the targeted moisture content). In some embodiments, the amount of feed deposited into the feed bunks can be adjusted. In some embodiments, data regarding the variation can be stored and then used when calculating the amount of fluid to add to subsequent batches.

In some embodiments, the amount of feed material deposited into the feed bunks(s) is adjusted based on the final moisture content and how it compares with a predetermined target moisture content. For example, in some embodiments, if the final moisture content is higher than the targeted amount, then the amount of feed material deposited into the feed bunk(s) can be adjusted upwardly to account for the lower energy density of the higher moisture feed material. In some embodiments, if the final moisture content is lower than the targeted amount, then the amount of feed material deposited into the feed bunks(s) can be adjusted downward to account for the higher energy density of the lower moisture feed material.

In some embodiments, data regarding the variation can be stored and then used when calculating the amount of fluid to add to subsequent batches. For example, if it is determined that a 1000-pound batch of a TMR is 2 weight percentage points of moisture below a targeted moisture content, then an additional amount of fluid equal to the 2 weight percentage points of moisture can be added to the next batch in order to account for this discrepancy. Thus, information from previous batches can be used to make final moisture content of future batches more accurate.

EXAMPLES

Example 1: Moisture Assessment of Various TMR Formulations

Measuring the moisture content of a TMR is technically challenging because of the presence of significant amounts of both free and bound moisture. Some types of sensors, such as more traditional capacitive sensors tend to have trouble measuring moisture content accurately in the presence of free moisture. In this example, various TMR formulations were tested for moisture content using a microwave-based moisture sensor such as those described herein (Hydronix) and comparing the result against a reference value for moisture content such as halogen-based moisture analyzer (Metler Toledo HR73-"HR73").

In each case, initial moisture readings (M0) of the TMR were obtained and then subsequent moisture measurements were made after a known amount of moisture was added to the TMR and mixed thoroughly (M1-M5).

| Composition of TMR A (A Finishing TMR) | |
|---|---|
| Modified Distillers | 16.54% |
| Alfalfa Hay | 2.01% |
| Corn Silage 2018 | 19.00% |
| Flaked Corn | 58.18% |
| Albers Finisher | 4.27% |

| Moisture Readings for TMR A | | | | | | | | | |
|---|---|---|---|---|---|---|---|---|---|
| ID | Ration A HR73 | Ration A HR73 | Ration A HR73 | Xbar HR73 | Ration A Raw F Hydronix | Ration A Raw V Hydronix | Ration A Raw E Hydronix | Ration A Filt F Hydronix | Water Added |
| MT | | | | | 0.53 | 3.38 | 0.45 | 0.60 | Empty |
| M0 | 23.83 | 24.81 | 26.30 | 25.0 | 22.87 | 22.55 | 19.13 | 22.93 | As received |
| M1 | 30.22 | 31.55 | 33.00 | 31.6 | 28.62 | 31.39 | 27.44 | 27.90 | +200 ml H2O |
| M2 | 36.24 | 35.64 | 39.64 | 37.2 | 38.60 | 46.54 | 45.61 | 38.50 | +400 ml H2O |
| M3 | 42.27 | 42.30 | 42.01 | 42.2 | 44.84 | 61.12 | 69.69 | 44.85 | +600 ml H2O |
| M4 | 47.28 | 48.39 | 47.26 | 47.6 | 53.12 | 69.02 | 82.20 | 50.73 | +800 ml H2O |
| M5 | 50.16 | 50.73 | 50.79 | 50.6 | 64.94 | 80.54 | 98.82 | 60.24 | +1000 ml H2O |

Figure 16:
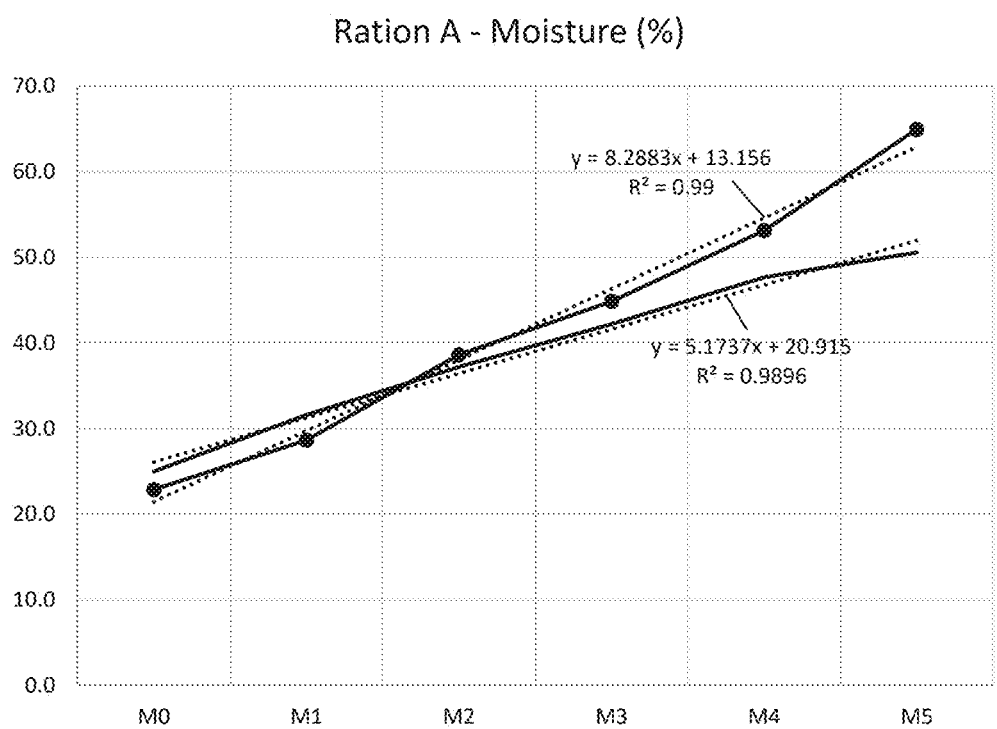
FIG. 16 is graph showing moisture content of a total mixed ration (TMR) as indicated by a system herein compared with reference values for moisture content.

The data for ration A are shown in FIG. 16.

| Composition of TMR B (A Growing TMR) | |
|---|---|
| Modified Distillers | 17.04% |
| Alfalfa Hay | 29.13% |
| Corn Silage 2018 | 19.00% |
| Flaked Corn | 31.63% |
| Albers Finisher | 3.20% |

| Moisture Readings for TMR B | | | | | | | | | |
|---|---|---|---|---|---|---|---|---|---|
| ID | Ration B HR73 | Ration B HR73 | Ration B HR73 | Xbar HR73 | Ration B Raw F Hydronix | Ration B Raw V Hydronix | Ration B Raw E Hydronix | Ration B Filt F Hydronix | Water Added |
| MT | | | | | 0.42 | 3.06 | 0.32 | 0.50 | Empty |
| M0 | 22.08 | 23.50 | 23.59 | 23.1 | 15.33 | 16.38 | 12.16 | 15.12 | As received |

-continued

| ID | | | | | | | | | Water Added |
|----|------|------|------|------|------|------|------|------|-------------|
| M1 | 30.72 | 28.87 | 30.08 | 29.9 | 22.70 | 24.52 | 19.90 | 22.79 | +200 ml H2O |
| M2 | 34.82 | 33.78 | 34.79 | 34.5 | 32.38 | 38.46 | 34.99 | 32.08 | +400 ml H2O |
| M3 | 40.18 | 39.59 | 40.61 | 40.1 | 41.18 | 52.50 | 54.94 | 41.14 | +600 ml H2O |
| M4 | 45.34 | 43.58 | 45.57 | 44.8 | 55.68 | 73.15 | 89.02 | 55.50 | +800 ml H2O |
| M5 | 49.75 | 48.90 | 48.35 | 49.0 | 62.35 | 78.74 | 94.85 | 63.07 | +1000 ml H2O |

Figure 17:
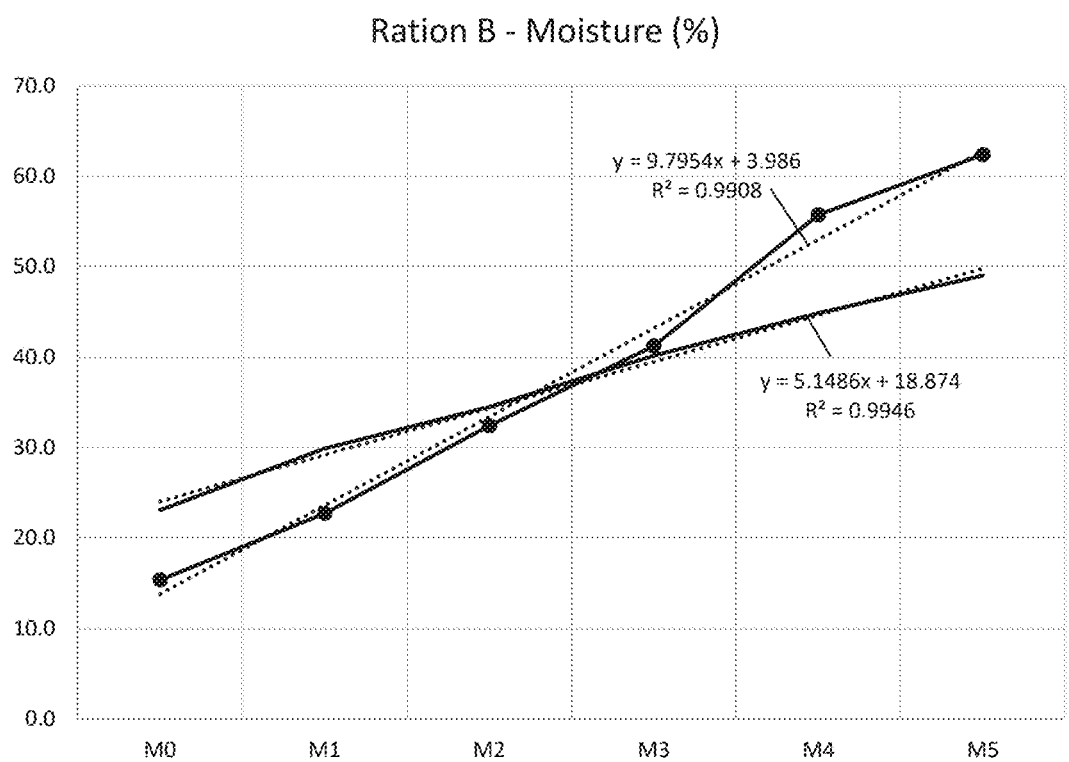
FIG. 17 is graph showing moisture content of a total mixed ration (TMR) as indicated by a system herein compared with reference values for moisture content.

The data for ration B are shown in FIG. 17.

| Composition of TMR C (A Growing TMR) | |
|---|---|
| Flaked Corn | 18% |
| Silage | 44% |
| Wet Distillers | 30% |
| Hay | 5% |
| Protein | 2.50% |

| Moisture Readings for TMR C | | | | | | | | |
|---|---|---|---|---|---|---|---|---|
| ID | Ration C HR73 | Ration C HR73 | Ration C HR73 | Xbar HR73 | Ration C Raw F Hydronix | Ration C Raw V Hydronix | Ration C Raw E Hydronix | Ration C Filt F Hydronix | Water Added |
| MT | | | | | 0.26 | 3.57 | 0.13 | 0.29 | Empty |
| M0 | 47.81 | 47.72 | 47.75 | 47.8 | 31.24 | 35.44 | 31.35 | 30.97 | As received |
| M1 | 52.13 | 51.43 | 49.65 | 51.1 | 39.97 | 47.96 | 48.12 | 39.81 | +200 ml H2O |
| M2 | 55.62 | 54.76 | 54.37 | 54.9 | 48.44 | 64.17 | 65.14 | 48.69 | +400 ml H2O |
| M3 | 58.22 | 56.58 | 58.42 | 57.7 | 53.32 | 68.23 | 80.95 | 53.86 | +600 ml H2O |
| M4 | 61.02 | 61.79 | 61.68 | 61.5 | 57.70 | 72.28 | 87.09 | 57.95 | +800 ml H2O |
| M5 | 66.39 | 67.89 | 67.37 | 67.2 | 66.09 | 83.68 | 100.00 | 66.13 | +1000 ml H2O |

Figure 18:
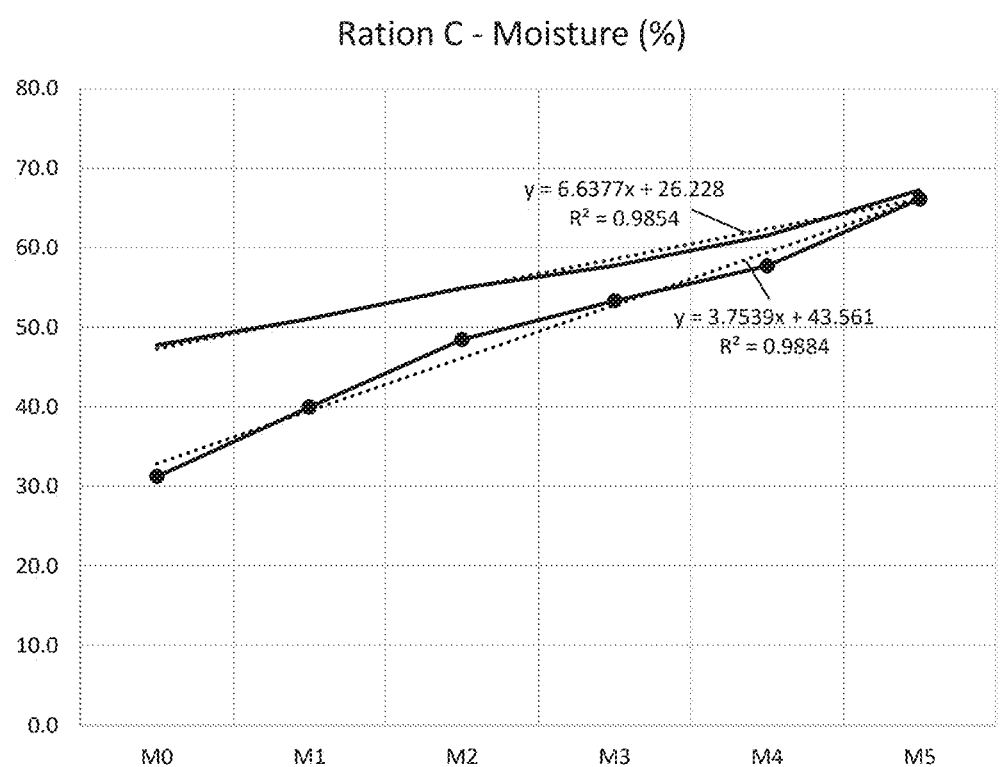
FIG. 18 is graph showing moisture content of a total mixed ration (TMR) as indicated by a system herein compared with reference values for moisture content.

The data for ration C are shown in FIG. 18.

| Composition of TMR D (A Finishing TMR) | |
|---|---|
| Flaked Corn | 50.0% |
| Silage | 12.0% |
| Wet Distillers | 29.0% |
| Fat | 1.5% |
| Protein | 4.0% |

| Moisture Readings for TMR D | | | | | | | | |
|---|---|---|---|---|---|---|---|---|
| ID | Ration D HR73 | Ration D HR73 | Ration D HR73 | Xbar HR73 | Ration D Raw F Hydronix | Ration D Raw V Hydronix | Ration D Raw E Hydronix | Ration D Filt F Hydronix | Water Added |
| MT | | | | | 0.48 | 3.74 | 0.19 | 0.54 | Empty |
| M0 | 38.23 | 37.06 | 37.59 | 37.6 | 30.92 | 29.99 | 27.44 | 30.64 | As received |
| M1 | 40.14 | 40.30 | 40.39 | 40.3 | 39.40 | 45.73 | 45.38 | 68.40 | +200 ml H2O |
| M2 | 44.29 | 43.76 | 44.86 | 44.3 | 45.65 | 57.14 | 62.73 | 45.71 | +400 ml H2O |
| M3 | 48.73 | 47.79 | 47.14 | 47.9 | 53.40 | 67.08 | 78.99 | 52.09 | +600 ml H2O |
| M4 | 51.06 | 51.60 | 49.19 | 50.6 | 67.10 | 81.21 | 97.82 | 66.67 | +800 ml H2O |
| M5 | 53.75 | 55.16 | 56.33 | 55.1 | 74.38 | 87.65 | 100.00 | 73.84 | +1000 ml H2O |

Figure 19:
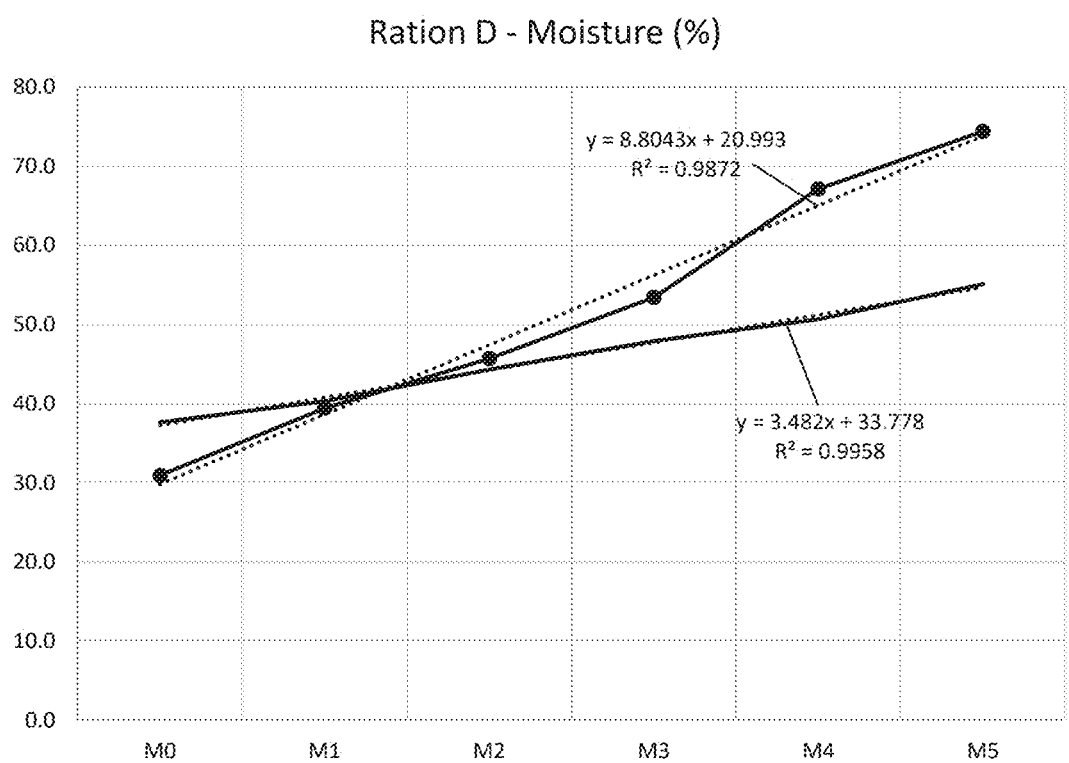
FIG. 19 is graph showing moisture content of a total mixed ration (TMR) as indicated by a system herein compared with reference values for moisture content.

The data for ration D are shown in FIG. 19.

This example shows that systems herein can be used to accurately measure moisture content of a variety of different TMR formulations regardless of the presence of significant free moisture.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

The technology has been described with reference to various specific and preferred embodiments and techniques. However, it should be understood that many variations and modifications may be made while remaining within the spirit and scope of the technology. As such, the embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

The invention claimed is:

1. A method of conditioning a total mixed ration, comprising:
    adding components of a total mixed ration to a vessel;
    adding fluid to the vessel, such that a moisture content of the components is increased on a percent by weight basis by at least 2 percentage points, wherein a fluid control controls the rate and amount of fluid being added,
    the fluid comprising water and a saponin containing composition;
    mixing the total mixed ration components and the fluid;
    continuously measuring the moisture content of the total mixed ration components within the interior volume of the vessel with a microwave sensor, wherein the microwave sensor is mounted on a wall of the vessel; and
    adjusting the rate or amount of fluid being added based on the measured moisture content of the total mixed ration components within the interior volume.

2. The method of claim 1, dispensing the content of the vessel into a feed bunk.

3. The method of claim 2, wherein the amount dispensed is adjusted based on the measured moisture content.

4. The method of claim 1, wherein the vessel is mounted on a mobile unit.

5. The method of claim 4, wherein mixing is performed while the mobile unit is in motion.

6. The method of claim 1, the total mixed ration comprising a forage component and a grain component.

7. The method of claim 1, wherein the step of adding components of a total mixed ration to a vessel comprises emptying the content of a batch box into the vessel.

8. The method of claim 1, wherein measuring the moisture content of the total mixed ration components within the interior volume of the vessel with a microwave sensor is performed at least once at an animal containment area remote from a feed supply area.

9. The method of claim 1, wherein adding components of a total mixed ration to the vessel and adding fluid to the vessel are performed at a feed supply area located remotely from an animal containment area.

10. The method of claim 1, further comprising
    storing data regarding the measured moisture content of the total mixed ration components within the interior volume of the vessel; and
    adjusting the amount of fluid added to a subsequent batch using the stored data.

11. The method of claim 1, wherein the fluid control is configured to enter a warning state when the moisture content of the interior of the vessel is not within an expected moisture range.

12. The method of claim 11, wherein the fluid control adjusts the amount of fluid being added in response to the warning state.

13. The method of claim 11, wherein the fluid control adjusts the rate of fluid being added in response to the warning state.

14. The method of claim 1, wherein the total amount of fluid added to the vessel is sufficient to raise the moisture content of a total mixed ration to about 30 to 60 percent moisture.

15. A method of conditioning a total mixed ration, comprising:
    adding components of a total mixed ration to a vessel;
    adding fluid to the vessel, wherein a fluid control controls the rate and amount of fluid being added, the fluid comprising water and a saponin containing composition;
    mixing the total mixed ration components and the fluid;
    measuring the moisture content of the total mixed ration components within the interior volume of the vessel with a microwave sensor while fluid is added to the vessel, wherein the microwave sensor is mounted on a wall of the vessel;
    comparing the measured moisture content of the total mixed ration components within the interior volume of the vessel with a predicted moisture range, wherein the predicted moisture range comprises a high moisture limit and a low moisture limit, wherein the high moisture limit and the low moisture limit change while the fluid is being added to the vessel and a magnitude of a gap between the high moisture limit and the low moisture limit decreases as time passes; and
    adding additional fluid to the total mixed ration in the vessel to raise the moisture content of the components within the vessel by at least 2 wt. percentage, wherein a rate at which the additional fluid is added is decreased when the measured moisture content is above the high moisture limit and the rate is increased when the measured moisture content is below the low moisture limit.

16. The method of claim 15, further comprising:
    displaying a predicted time that the method of conditioning a total mixed ration will be completed at on a user interface.

17. The method of claim 16, further comprising:
adjusting the predicted time based on the measured moisture content, and displaying the adjusted predicted time.

18. The method of claim 1, further comprising:
measuring the moisture content of at least a portion of the components of the total mixed ration components with a second microwave sensor prior to the components being added to the vessel.

19. The method of claim 15, further comprising:
storing data regarding the measured moisture content, wherein storing data is performed on a control module with memory, and the data is used to update fluid addition parameters for future conditioning batches.

* * * * *